(12) United States Patent
Hachitani

(10) Patent No.: US 6,607,999 B2
(45) Date of Patent: Aug. 19, 2003

(54) GLASS FOR CATHODE-RAY TUBE, STRENGTHENED GLASS, METHOD FOR THE PRODUCTION THEREOF AND USE THEREOF

(75) Inventor: Yoichi Hachitani, Tokyo (JP)

(73) Assignee: Hoya Corporation, Tokyo (JP)

( * ) Notice: Subject to any disclaimer, the term of this patent is extended or adjusted under 35 U.S.C. 154(b) by 64 days.

(21) Appl. No.: 09/783,400

(22) Filed: Feb. 15, 2001

(65) Prior Publication Data

US 2001/0049327 A1 Dec. 6, 2001

(30) Foreign Application Priority Data

| Feb. 17, 2000 | (JP) | ................................. | 2000-039096 |
| Jun. 2, 2000 | (JP) | ................................. | 2000-165917 |
| Jun. 2, 2000 | (JP) | ................................. | 2000-166574 |

(51) Int. Cl.[7] .................. C03C 3/085; C03C 3/087; C03C 15/00
(52) U.S. Cl. .................... 501/69; 501/70; 501/73; 65/30.14; 313/480
(58) Field of Search ............. 501/59, 62, 64, 501/66, 70, 78, 73, 77, 69, 72; 65/30.13, 30.14

(56) References Cited

U.S. PATENT DOCUMENTS

| 4,337,410 A | | 6/1982 | Van der Geer et al. |
| 4,897,371 A | | 1/1990 | Suzuki et al. |
| 5,057,134 A | | 10/1991 | Suzuki et al. |
| 5,296,294 A | | 3/1994 | Suzuki et al. |
| 5,445,285 A | | 8/1995 | Sugawara et al. |
| 6,217,971 B1 | * | 4/2001 | Wolff et al. ................ 428/426 |
| 6,306,786 B1 | * | 10/2001 | Koyama et al. ............ 428/410 |
| 6,332,338 B1 | * | 12/2001 | Hashimoto et al. ........ 65/29.21 |

FOREIGN PATENT DOCUMENTS

| GB | 2221083 A | | 1/1990 | |
| JP | 50-105705 | | 8/1975 | |
| JP | 59-27729 | | 4/1981 | |
| JP | 7-108797 | | 8/1988 | |
| JP | 1-319232 | | 12/1989 | |
| JP | 2671766 | | 1/1995 | |
| JP | 2904067 | | 5/1996 | |
| JP | 2837134 | | 12/1996 | |
| JP | 11302033 A1 | * | 11/1999 | |
| WO | WO 9906333 A1 | * | 2/1999 | ........... C03C/3/087 |

* cited by examiner

Primary Examiner—David Sample
Assistant Examiner—Elizabeth A Bolden
(74) Attorney, Agent, or Firm—Nixon & Vanderhye P.C.

(57) ABSTRACT

A glass for a cathode ray tube which glass can be decreased in thickness and weight, a glass panel for a cathode ray tube, a cathode ray tube and methods for producing them. Strengthened glass having a high bending strength and a thick stress-strain layer, a glass for a display which is made of the strengthened glass, particularly, a glass panel for a cathode ray tube and a cathode ray tube. The glasses include (1) a glass for a cathode ray tube which is made of a chemically strengthened glass and has a Young's modulus of at least 90 GPa, (2) a glass for a cathode ray tube, which is a chemically strengthened glass from a matrix glass which contains $SiO_2$, $Al_2O_3$, an alkali metal oxide, SrO and $ZrO_2$ and has an $Al_2O_3$ content of more than 4% by weight but not more than 20% by weight and an SrO content of 5 to 20% by weight, and (3) a strengthened glass formed by chemical strengthening of a physically strengthened matrix glass at a temperature lower than the strain temperature of the matrix glass.

7 Claims, No Drawings

GLASS FOR CATHODE-RAY TUBE, STRENGTHENED GLASS, METHOD FOR THE PRODUCTION THEREOF AND USE THEREOF

TECHNICAL BACKGROUND

1. Field of the Invention

The present invention relates to (1) a glass for a cathode-ray tube, a glass panel for a cathode-ray tube for which the above glass is applied, a cathode-ray tube and a process for the production thereof, (2) a glass for a cathode-ray tube, a process for the production thereof and a glass panel for a cathode-ray tube and a cathode-ray tube to which the glass for a cathode-ray tube is applied, and (3) a strengthened glass, a process for the production thereof, a glass made of the above strengthened glass for a display and a glass panel for a cathode-ray tube and a cathode-ray tube for which the above glass is applied.

2. Related Art Statement

It is conventional practice to use a glass having large contents of PbO, SrO and BaO as a glass for a cathode-ray tube (CRT). For example, JP-B-59-27729 discloses a CRT face plate (glass panel) containing BaO, SrO and BaO. However, a glass of this type has a bending strength of approximately 50 to 100 MPa, and it is required to increase the thickness thereof for ensuring strength, so that the face plate is to have an extraordinarily large weight for satisfying a larger display screen (for example, a glass panel for a 36-inch CRT has a thickness of 20 mm or more and has a weight of approximately 40 kg). The weight of a cathode-ray tube is greatly dependent upon a glass panel, so that there is caused a problem that a cathode-ray tube using such a glass panel comes to have a considerably large weight.

In a flat-surface cathode-ray tube which has been available in recent years, a glass panel having a flat face is required to support vacuum inside the CRT and atmospheric pressure outside unlike a conventional curved glass panel, so that the panel is increased in thickness or there is employed a method using a physically strengthened glass.

With regard to the physically strengthened glass, Japanese Patent No. 2,671,766 discloses a glass bulb for a cathode-ray tube, which glass bulb is produced by physical strengthening.

In a physical strengthening method, however, a stress-strain layer (including a compression stress layer) having a moderate profile is formed, so that the physical strengthening method, if anything, is suitable for strengthening a glass having a large thickness. However, no sufficient stress-strain layer can be secured in a glass having a small thickness, so that it is difficult to attain high strength. As a consequence, it is difficult to decrease the thickness of a glass panel by physical strengthening, and a decrease in the weight of a glass panel cannot be expected. Further, since this physically strengthened glass has a strain point of approximately 470° C. as described in Japanese Patent No. 2,671,766, if it is partly exposed to a higher temperature for some time when heated to approximately 450° C. in a frit-sealing step, the stress-strain may be alleviated and the desired bending strength may not be obtained. Further, the panel glass disclosed in Japanese Patent 2,671,766 has a Young's modulus of approximately 76 GPa, and the glass is liable to be deformed under atmospheric pressure when decreased in thickness.

Japanese Patent No. 2,904,067 discloses a CRT panel constituted of a physically strengthened panel.

It is said that the physically strengthened glass such as an air-cooled strengthened glass generally has a bending strength of 200 to 300 MPa. This physically strengthened glass is obtained by a method in which a glass is rapidly cooled from a temperature around its softening point to a temperature around its strain point to provide a temperature difference between the inside of the glass and the glass surface, whereby a compression stress layer is formed in the glass surface. The merit of this method is that a stress-strain layer having a thickness approximately ⅙ as large as the thickness of the glass panel can be formed. However, this method involves a problem that it is not suitable for a glass having such a small thickness that it is difficult to provide a temperature difference between the inside and the surface of the glass or a glass having such a complicated form that no uniform temperature distribution can be obtained. A glass panel for a CRT generally has a complicated form consisting of a flat face portion (image display screen) and a junction portion that is located outside the flat face portion and is to be bonded to a skirt (frame)-shaped funnel. Particularly, while the outer surface of the face portion is flat, the inner surface of the face portion has a curvature due to the scanning of an electron gun. The glass panel is non-uniformly cooled so that the panel surface is liable to be distorted or undulated. Further, an air-cooled strengthened glass internally has a tensile-stress layer having a size approximately ½ as large as a compression stress. A general air-cooled strengthened glass has a compression stress of approximately 50 to 150 MPa and a tensile stress of approximately 25 to 75 MPa. When cracking develops inside, therefore, the above large tensile stress is instantly released and a phenomenon called self-fracture is caused to take place in some cases. It therefore involves a problem to apply a glass that is only physically strengthened as above to a CRT panel.

For the above reasons, in Japanese Patent No. 2,904,067, the above rapid cooling is not carried out, but the cooling is moderately carried out by applying cold air to a glass while the glass is cooled from an annealing point to a strain point. The tensile stress in the center is small. However, the compression stress in the surface is small as well, and the bending strength of the glass also decreases. Such a glass has a compression stress of approximately 5 to 30 MPa, a tensile stress of 2 to 15 MPa and a bending strength of 100 to 150 MPa. For supporting a difference between pressures inside and outside a CRT with the glass having a bending strength of 100 to 150 MPa, it is inevitable to increase the glass thickness, so that the glass comes to have a large thickness and a large weight.

Japanese Patent 2,904,067 also discloses a method for chemically strengthening a glass panel for a CRT. As is concluded in the above Japanese Patent, the chemical strengthening fails to produce a sufficient stress-strain layer, and it is said that the thus-chemically-strengthened glass is unsuitable as a glass for a CRT. Further, JP-A-1-319232 discloses a chemically strengthened glass for a CRT. However, when the stress-strain layer has a small thickness, if the glass is damaged due to an external shock during the production of a CRT or use of a CRT as a product, the crack may penetrate the stress-strain layer and the glass may break.

Further, Japanese Patent No. 2,837,134 discloses a chemically strengthened glass having a high ion exchange ratio. The glass disclosed in this Patent has a stress-strain layer having a thickness of 200 μm or more and a bending strength of at least 800 MPa. However, it has been found that the above glass has a low X-ray absorption coefficient and fails to satisfy the X-ray absorption coefficient of 28/cm that is the standard for glass panels for a CRT. More specifically, the above glass is not required to contain any other component than $ZrO_2$ for increasing the X-ray absorption coefficient. For example, when the content of $ZrO_2$ is increased to its maximum amount of 15% by weight, the above glass shows an X-ray absorption coefficient of only approximately 25/cm. Moreover, $ZrO_2$ is a component that is not easily soluble in a glass, and if it is incorporated in an amount of more than 10% by weight, most of such an additional portion remains undissolved.

In actuality, there has been found no glass that satisfies a stress-strain layer having a thickness of at least 100 $\mu$m, a high bending strength of at least 300 MPa and an X-ray absorption coefficient of at least 28/cm. Therefore, a CRT glass panel inevitably has a large thickness and a large weight, and for example, a TV receiver has a very large weight. Specifically, a 36-inch CRT panel has a central thickness of approximately 20 mm and has a weight of approximately 40 kg.

Meanwhile, a glass panel for a cathode ray tube is colored or browned due to irradiation with electron beams, and there is known a method in which the alkali ion concentration of a surface layer of the glass panel is changed by ion exchange for preventing the coloring (browning) of the glass panel.

For example, JP-A-50-105705 discloses a method for producing a glass to be irradiated with electron beams, in which lithium or sodium present in the surface layer of the glass is decreased by ion-exchanging the lithium or sodium with at least one of potassium, rubidium, cesium and hydrogen for preventing the browning.

JP-B-7-108797 discloses a glass panel to be irradiated with electron beams, in which potassium ion and lithium ion are substituted for sodium ion of at least an electron-beams-irradiation surface of a panel made of a soda lime silica glass. It is described that the entering depth of the substituted lithium ion is preferably 10 $\mu$m, that the entering depth of the substituted potassium ion is preferably 5 to 20 $\mu$m and that when the above depths are smaller or larger, the effect on preventing the browning decreases. However, the soda lime silica glass has a Young's modulus of approximately 73 GPa, and when the panel is decreased in thickness, the panel is liable to deform.

When the above ion-exchange alone is carried out for preventing the browning, no sufficient strength is attained. In this method, therefore, the glass for a flat-surface Braun tube is required to have a large thickness as compared with a glass for a conventional curved Braun tube.

The above method of ion-exchange for preventing the browning is not at all intended for use for a flat-surface Braun tube, nor is it intended for attaining a decrease in the thickness of a Braun tube and a decrease in the weight thereof. In the beginning, the above method does not seek to attain high strength.

Nothing has been studied with regard to the composition and properties of a glass required for decreasing the thickness and the weight of a glass panel for a cathode ray tube.

It is conventional practice to increase the thickness of a panel for attaining sufficient strength, and no glass panel for a cathode ray tube has been developed which panel has materialized the decrease in the thickness and weight.

SUMMARY OF THE INVENTION

Under the circumstances, it is a first object of the present invention to provide a glass for a cathode ray tube which glass can be decreased in thickness and weight, a glass panel for a cathode ray tube which panel is made of the above glass, a cathode ray tube having the glass panel, a method for producing the above glass and a matrix glass for a cathode ray tube.

It is a second object of the present invention to provide a glass for a cathode ray tube which glass has high strength and a high X-ray absorption coefficient and is obtained by chemical strengthening of a matrix glass in which a stress-strain layer can be formed by ion-exchange so as to reach a deep layer in the glass, a glass panel for a cathode ray tube which panel is made of the above glass, and a cathode ray tube having the above glass panel.

Further, it is a third object of the present invention to provide a strengthened glass which may have a composition incapable of giving a stress-strain layer having a large thickness by a conventional chemical strengthening but which has a high bending strength and a stress-strain layer having a large thickness, a glass for a display which glass is made of the above strengthened glass, a glass panel for a cathode ray tube in particular which glass panel is made of the above strengthened glass, and a cathode ray tube having the above glass panel.

The present inventor has made diligent studies for achieving the above first object and as a-result has found the following. Even if a known glass composition for a cathode ray tube is sufficiently chemically strengthened, it is impossible to achieve a decrease in thickness and weight, and the present inventor has developed a glass having a higher bending strength (at least 300 MPa, particularly at least 500 MPa) than any conventional glass for a cathode ray tube. Even if the bending strength is increased, however, a vacuum is maintained inside a cathode ray tube and atmospheric pressure is externally exerted, so that a glass panel of a flat Braun tube in particular tends to curve to a greater extent due to a difference in pressures inside and outside the glass with a decrease in the thickness of the glass, which causes distorted images. The present inventor has further developed a glass for a cathode ray tube which glass has a higher bending strength and a higher Young's modulus than any conventional glass for a cathode ray tube, and it has been found that attaining a decrease in thickness and weight not only requires a large value of bending strength but also requires a Young's modulus of at least 90 GPa (particularly, at least 95 GPa). Further, there have been found properties such as bending strength, specific elastic modulus (Young's modulus/specific gravity), a thickness of a stress-strain layer and a strain point that are required for attaining a decrease in thickness and weight.

For decreasing the thickness and the weight of a glass panel for a cathode ray tube, conventionally, nothing has been taken account of with regard to the bending strength and the Young's modulus of a glass and a decrease in the strength of a damaged surface of a panel.

Further, the present inventor has made diligent studies for achieving the above second object and has found that a glass obtained by chemically strengthening a matrix glass having a specific composition can achieve the second object.

Further, the present inventor has made diligent studies for achieving the above third object and has found that a glass obtained by physically strengthening a matrix glass and further chemically strengthening the glass at a temperature lower than the strain point of the matrix glass can achieve the third object.

The present invention has been completed on the basis of the above findings.

That is, the above first object of the present invention is achieved by (1) a glass for a cathode ray tube, which is made of a chemically strengthened glass and has a Young's modulus of at least 90 GPa (to be referred to as "glass Ia for a cathode ray tube"), (2) a matrix glass for a cathode ray tube, which comprises $SiO_2$, $Al_2O_3$, $Li_2O$, $Na_2O$, SrO, $TiO_2$, $ZrO_2$ and $CeO_2$ and also contains MgO or CaO or both, and which has an $Li_2O$ content of 5 to 20 mol %, an SrO content of 3 to 15 mol % and a $ZrO_2$ content of 0.1 to 5 mol %, (3) a glass for a cathode ray tube, formed from the matrix glass for a cathode ray tube in the above (2) by chemical strengthening (to be referred to as "glass Ib for a cathode ray tube"), (4) a method for producing a glass for a cathode ray tube, which comprises chemically strengthening the matrix glass for a cathode ray tube in the above (2) by ion-exchange treatment thereof in a bath containing Na ion or K ion or both at a temperature of 350° C. to 550° C., (5) a glass panel for a cathode ray tube, made of the glass for a cathode ray tube in the above (1) or (3), (6) a method for producing a glass panel for a cathode ray tube, which comprises the steps of
processing the matrix glass for a cathode ray tube in the above (2) to a panel form, and
chemically strengthening thus-processed glass by ion-exchange in a bath containing Na ion or K ion or both at a temperature of 350° C. to 550° C., (7) a cathode ray tube comprising the glass panel for a cathode ray tube in the above (5), and (8) a method for producing a cathode ray tube, which comprises the step of integrating the glass panel for a cathode ray tube in the above (5) and a funnel by frit sealing under heat. The above aspect of the present invention will be referred to as the invention 1 hereinafter.

Further, the above second object of the present invention is achieved by (9) a glass for a cathode ray tube, which is formed by chemical strengthening of a matrix glass which comprises $SiO_2$, $Al_2O_3$, an alkali metal oxide, SrO and $ZrO_2$ and has an $Al_2O_3$ content of more than 4% by weight but not more than 20% by weight and an SrO content of 5 to 20% by weight (to be referred to as "glass II for a cathode ray tube),

(10) a glass panel for a cathode ray tube, which is formed of the glass for a cathode ray tube in the above (9),

(11) a cathode ray tube comprising the glass panel for a cathode ray tube in the above (10), and

(12) a method for producing a glass for a cathode ray tube by chemical strengthening of a matrix glass, which comprises the step of chemically strengthening a matrix glass comprising $SiO_2$, $Al_2O_3$, an alkali metal oxide, SrO and $ZrO_2$ and having an $Al_2O_3$ content of more than 4% by weight but not more than 20% by weight and an SrO content of 5 to 20% by weight by ion-exchange treatment thereof in a bath containing an alkali metal ion at a temperature of 350° C. to 550° C. The above aspect of the present invention will be referred to as the invention 2 hereinafter.

Further, the above third object of the present invention is achieved by

(13) a strengthened glass formed by chemical strengthening of a physically strengthened matrix glass at a temperature lower than the strain temperature of the matrix glass (to be referred to as "strengthened glass IIIa" hereinafter),

(14) a strengthened glass having a stress-strain layer having a thickness of at least 250 μm and having a bending strength of at least 300 MPa (to be referred to as "strengthened glass IIIb" hereinafter),

(15) a glass for a display, which is formed of the strengthened glass in the above (13) or (14),

(16) a glass panel for a cathode ray tube, which is formed of the glass for a display in the above (15),

(17) a cathode ray tube comprising the glass panel in the above (16),

(18) a method for producing a strengthened glass, which comprises physically strengthening a matrix glass containing an alkali metal, and then further chemically strengthening the physically strengthened matrix glass at a temperature lower than the strain temperature of the matrix glass, and

(19) a method for producing a cathode ray tube, which comprises providing a matrix glass having an X-ray absorption coefficient of at least 28/cm, preparing a strengthened glass therefrom according to the method in the above (18) to obtain a glass panel, and integrating the glass panel and a funnel with a frit seal under heat. The above aspect of the present invention will be referred to as the invention 3 hereinafter.

PREFERRED EMBODIMENTS OF THE INVENTION

Frist, the invention 1 will be explained below.

The glass Ia for a cathode ray tube according to the invention 1 is formed of a chemically strengthened glass, and since (1) the glass Ia has a Young's modulus of at least 90 GPa, it does not easily bend, so that it can be decreased in thickness. When the Young's modulus is less than 90 GPa, the glass bends and is liable to deform due to an external force such as atmospheric pressure and a load. When the thickness of a glass panel for a flat-surface Braun tube is decreased (for example, to a 1/200 to 1/50 of a diangonal-line length), a glass may bend and images are distorted, so that it is difficult to decrease the glass in thickness.

As already described, it is conventional practice to increase the glass in thickness for attaining sufficient strength, and no thin glass panel for a cathode ray tube has been developed. Further, there has been developed no glass for a cathode ray tube which glass has strength sufficient for decreasing the thickness thereof, and a glass that can be obtained as a glass for a cathode ray tube has a Young's modulus of only approximately 75 GPa. It has been therefore difficult to confirm or estimate what Young's modulus is required for attaining a sufficiently thin glass panel.

The present inventors has developed a glass for a cathode ray tube, which glass has both a high bending strength and a high Young's modulus as compared with conventional glasses, and it has been found that having a high bending strength alone is not sufficient for attaining a decrease in thickness and weight and that a glass is required to have a Young's modulus of at least 90 GPa for a decrease in thickness and weight. In the present invention, Young's modulus is an essential factor for preventing deformation caused by an external force.

The glass Ia for a cathode ray tube, provided by the present invention, has a Young's modulus of at least 90 GPa, so that it does not easily bend even if its thickness is decreased. A thin panel made thereof can therefore maintain a flatness. In particular, a thin flat glass panel for a cathode ray tube has been accordingly materialized for the first time.

When the glass Ia of the present invention has a Young's modulus of at least 90 GPa and a bending strength of 300 MPa (particularly, at least 500 MPa), desirably, the glass for a cathode ray tube can be decreased in thickness while retaining pressure durability (duarability against a load).

In the glass Ia for a cathode ray tube, provided by the present invention, preferably, (2) the specific elastic modulus (Young's modulus/specific gravity) is at least 30 GPa. So long as the specific elastic modulus is at least 40 GPa, the glass can be decreased in thickness and the weight thereof can be decreased.

For decreasing the thickness and the weight of the glass, it is not sufficient to take account of its Young's modulus and its bending strength alone. That is, in a glass having high-strength but having a high specific gravity, the high specific gravity destroys the weight decrease attained by the high strength. The present inventor has found that when the specific elastic modulus which is a function of Young's modulus and spefic gravity is at least 30 GPa, the glass can be decreased in thickness and can be decreased in weight. When the speicific elastic modulus is less than 30 GPa, the effect on decreasing the weight is small.

In the glass Ia for a cathode ray tube, provided by the present invention, preferably, (3) the strain point is at least 500° C. When the strain point is 500° C. or higher, the stress-strain of the glass is not alleviated even if the glass is heat-treated, so that the strength of the glass decreases in no case.

For example, the production of a cathode ray tube involves the step of bonding a glass panel and a funnel glass with a frit glass under heat around 450° C. When a glass for a cathode ray tube has a strain point of 500° C. or higher, the stress-strain is not alleviated in a heating step such as a frit sealing step, so that the strength does not decrease. For this reason, the glass Ia of the present invention is suitable for use for which strength is required and heat treatment is carried out.

In the glass Ia for a cathode ray tube, provided by the present invention, preferably, (4) the internal tensile stress is less than 20 MPa. The internal tensile stress refers to a tensile stress in a portion as deep as half of the thickness of a chemically strengthened glass having the form of a plate or a panel, for example, a deep portion equidistant from two main surfaces of a glass having a plate form. Further, preferably, (5), the chemically strengthened glass has a surface compression stress of at least 100 MPa.

In the present invention, the strengthened glass of the present invention can have an interal tensile stress of less than 20 MPa, so that the possibility of the glass undergoing self-fracture can be remarkably decreased. Further, since the strengthened glass of the present invention also has a high surface comprssive stress and a high bending strength, the glass panel can be decreased in weight.

For attaining a thickness-decreased and weight-decreased flat-surface Braun tube, preferably, the glass Ia for a cathode ray tube satisfies all of the above conditions (1) to (5).

The glass Ia for a cathode ray tube, provided by the present invention, can be obtained by chemical strengthening of a matrix glass which contains $SiO_2$, $Al_2O_3$, $Li_2O$, $Na_2O$, SrO, $TiO_2$, $ZrO_2$ and $CeO_2$ and also contains MgO or CaO or both. The matrix glass containing the above components can give the glass Ia for a cathode ray tube which glass Ia has a high Young's modulus, which glass can be easily imparted with high strength (bending strength, Knoop hardness, etc.) by ion-exchange and which glass satisfies the above condition (1) and at least one of the above conditions (2) to (4).

According to the invention I, there is also provided a matrix glass for a cathode ray tube, and the matrix glass for a cathode ray tube which comprises $SiO_2$, $Al_2O_3$, $Li_2O$, $Na_2O$, SrO, $TiO_2$, $ZrO_2$ and $CeO_2$ and also contains MgO or CaO or both, and which has an $Li_2O$ content of 5 to 20 mol %, an SrO content of 3 to 15 mol % and a $ZrO_2$ content of 0.1 to 5 mol %.

The above matrix glass of the present invention has a high Young's modulus and high X-ray absorptivity and has high resistance to the coloring that irradiation with X-ray causes on a glass (the coloring of a glass with irradiation with X-ray does not easily take place). The above matrix glass can easily give a glass having high strength (bending strength, Knoop hardness, etc.) by ion exchange and is suitable for chemical strengthening.

The above matrix glass has the following effects in particular.

Since the matrix glass has an $Li_2O$ content of 5 to 20 mol %, ion exchange is promoted.

Since the matrix glass has an SrO content of 3 to 15% mol %, X-ray absorption is improved, and a decrease in Young's modulus and a decrease in bending strength can be prevented.

Since the matrix glass has a $ZrO_2$ content of 0.1 to 5 mol %, the X-ray absorption coefficient and the Young's modulus are improved.

Further, when the matrix glass has a $CeO_2$ content of approximately 0.01 to 1 mo %, desirably, the coloring (browning) caused by X-ray can be prevented.

The above matrix glass preferably has an $SiO_2$ content of 40 to 70 mol %, an $Al_2O_3$ content of 0.1 to 15 mol %, an $Na_2O$ content of 0.1 to 10 mol %, an MgO content of 0 to 15 mol %, a CaO content of 0 to 15 mol % and $TiO_2$ content of 0.1 to 15 mol % and has an $SiO_2+Al_2O_3+Li_2O+Na_2O+SrO+TiO_2+ZrO_2+CeO_2+MgO+CaO$ total content of at least 85 mol %.

The above matrix glass having the above composition can give a glass having a higher Young's modulus.

Since the contents of $Al_2O_3$, $Li_2O$ and $Na_2O$ are well balanced in the matrix glass, the matrix glass can give a glass having high strength (bending strength, Knoop hardness, etc.) by ion exchange.

Since the matrix glass has predetermined contents of SrO, $TiO_2$, $ZrO_2$, Cao and MgO, the X-ray absorption coefficient can be improved.

The glass having the above composition can satisfy the foregoing conditions (1) to (5).

Further, the total content of $SiO_2$, $Al_2O_3$, $Li_2O$, $Na_2O$, SrO, $TiO_2$, $ZrO_2$, $CeO_2$, MgO and Cao is more preferably 90 mol % or more.

In addition to the above glass components, the glass matrix of the present invention may contain, as an optional component, 15 mol % or less of at least one selected from BaO, ZnO, $La_2O_3$, $Cs_2O$, $P_2O_5$, $B_2O_3$, $Y_2O_3$, $Nb_2O_5$, $Sb_2O_3$, $SnO_2$, $K_2O$ or F.

The above optional components serve to improve meltability, to improve clarification and devitrification resistance, to adjust the viscosity of a glass, to adjust a thermal expansion coefficient and an X-ray absorption coefficient, to adjust the Young's modulus, to adjust an ion-exchange rate, to prevent solarization and to prevent browning, so that they makes it easy to produce the glass and serves to adjust the properties of the glass. The content of the above optional component(s) is more preferably 10 mol % or less.

In the matrix glass for a cathode ray tube, $SiO_2$ is an essential component for a glass. When the content thereof is less than 40 mol %, the glass may be poor in devitrification resistance and chemical durability, and when it exceeds 70 mol %, it is sometimes difficult to melt the matrix glass. The content of $SiO_2$ is preferably 40 to 70 mol %, more preferably 45 to 60 mol %, more preferably 50 to 55 mol %.

$Al_2O_3$ is a component for improving a glass in devitrification resistance and chemical durability and improving the efficiency of ion exchange. When the content thereof is less than 0.1 mol %, the effects thereof may not be fully exhibited. When it exceeds 15 mol %, the glass may be poor in devitrification resistance. The content of $Al_2O_3$ is preferably 0.1 to 15 mol %. Further, $Al_2O_3$ is also a component for increasing the X-ray absorption coefficient, and the content thereof is more preferably 1 to 10 mol %, and still more preferably 1 to 5 mol %.

$Li_2O$ is a component for chemically strengthening a glass by undergoing ion-exchange in a glass surface portion mainly with Na ion in an ion-exchange bath. When the content thereof is less than 5 mol %, the effect thereof is not fully exhibited. When it exceeds 20 mol %, the devitrification resistance and the chemical durability decrease. The content of $Li_2O$ is therefore limited to 5 to 20 mol %. Since $Li_2O$ is also a component for decreasing the X-ray absorption coefficient, the content thereof is preferably 10 to 15 mol %.

$Na_2O$ is a component for chemically strengthening a glass by undergoing ion-exchange in a glass surface portion mainly with K ion in an ion-exchange bath and for preventing browning. When the content thereof is less than 0.1 mol %, the effect thereof may not be fully exhibited. When it exceeds 10 mol %, it causes the devitrification resistance and chemical durability of the glass to decrease. The content of $Na_2O$ is therefore preferably 0.1 to 10 mol %. Since $Na_2O$ is also a component for decreasing the X-ray absorption coefficient as well, the content thereof is preferably 1 to 5 mol %.

MgO is a component for improving a glass in Young's modulus, and the matrix glass may contain 0 to 15 mol % of MgO. When the content thereof exceeds 15 mol %, the X-ray absorption coefficient may be sometimes decreased. The content of MgO is therefore preferably 0 to 15 mol %, more preferably 5 to 10 mol %.

CaO is a component for improving a glass in X-ray absorption coefficient and Young's modulus, and the matrix glass may contain 0 to 15 mol %. When the content thereof exceeds 15 mol %, the liquidus temperature may sometimes increase. The content of CaO is therefore preferably 0 to 15 mol %, more preferably 5 to 10 mol %.

SrO is a component that plays an important role in the glass of the present invention. SrO is a component that can remarkably increase the X-ray absorption coefficient, and it has been found that SrO does not much decrease the Young's modulus and the bending strength when added. When the content thereof is less than 3 mol %, the X-ray absorption coefficient is less than 28. When it exceeds 15 mol %, the devitrification resistance decreases. The content of SrO is therefore limited to 3 to 15 mol %. The content of SrO is preferably 5 to 13 mol %.

BaO is an optional component, and since it is a component for improving the X-ray absorption coefficient, it may be incorporated. However, the function of BaO to increase the X-ray absorption coefficient is approximately half the function of SrO, and BaO is also a component that decreases the Young's modulus, so that the content of BaO is preferably 0 to 5 mol %.

ZnO is an optional component and has a high effect on increasing the X-ray absorption coefficient. Since, however, it decreases the bending strength and the Young's modulus, the content thereof is preferably less than 5 mol %.

$TiO_2$ is a component for improving a glass in Young's modulus and X-ray absorption coefficient and for preventing the coloring caused by X-ray. When the content thereof is less than 0.1 mol %, the effect thereof may not be fully exhibited. When it exceeds 15 mol %, the devitrification resistance may sometimes decrease. The content of $TiO_2$ is therefore preferably 0.1 to 15 mol %. Further, $TiO_2$ absorbs light having a shorter wavelength of light that a glass transmits, and it is liable to cause the glass to be colored, so that the content thereof is therefore preferably 0.1 to 5 mol %.

$ZrO_2$ is also one of components that play important roles in the glass of the present invention. $ZrO_2$ is a component for improving a glass in Young's modulus, X-ray absorption coefficient and bending strength. When the content thereof is less than 0.1 mol %, the effect thereof is not exhibited. When it exceeds 5 mol %, a remaining undissolved portion of a glass is liable to take place. The content of $ZrO_2$ is therefore limited to 0.1 to 5 mol %. The content of $ZrO_2$ is preferably 1 to 3 mol %.

$CeO_2$ is a component for preventing the coloring (browning) caused by X-ray. The content thereof is preferably 0.01 to 1 mol %.

$K_2O$ is an optional component and may be incorporated into the matrix glass for preventing the coloring (browning) caused by X-ray. The content thereof is preferably 0 to 5 mol %.

In addition to the above glass components, the above glass matrix may contain one or more optional components selected from $La_2O_3$, $Cs_2O$, $P_2O_5$, $B_2O_3$, $Y_2O_3$, $Nb_2O_5$, $Sb_2O_3$, $SnO_2$, $K_2O$ or F for making it easier to produce a glass or adjusting the properties of the glass, namely for an improvement in meltability, clarification, an improvement in devitrification resistance, adjustment of the viscosity of a glass, adjustment of a thermal expansion coefficient and an X-ray absorption coefficient, adjustment of the Young's modulus, adjustment of an ion-exchange rate, prevention of solarization and prevention of browning.

Further, the above matrix glass may contain, as an optional component, 1 mol % or less of at least one selected from oxides of Ni, Co, Fe, Mn, V, Cu and Cr.

The above optional component can serve to adjust the transmissivity of a glass, so that the glass can be improved in contrast and that a display screen can be color-corrected.

As a glass panel for a cathode ray tube, it is general practice to use a glass whose transmissivity is intentionally decreased by adding NiO, $Co_2O_3$, or the like. When the glass panel is decreased in thickness, the transmissivity increases, and the contrast decreases. For decreasing the glass panel in thickness, it is essential to incorporate a necessary amount of such a component. The content of the above optional component is more preferably 0.1 mol % or less.

The matrix glass for a cathode ray tube, provided by the present invention, substantially does not contain PbO. That is because it is environmentally undesirable to use PbO and because PbO is a component that degrades the chemical strengthening and decreases the Young's modulus.

The matrix glass for a cathode ray tube, provided by the present invention, preferably has a composition 1 comprising, by mol %,

| | |
|---|---|
| $SiO_2$ | 50 to 60% |
| $Al_2O_3$ | 1 to 10% |
| $Li_2O$ | 10 to 20% |
| $Na_2O$ | 0.1 to 8% |
| $CeO_2$ | 0.01 to 1% |
| MgO | 1 to 10% |
| CaO | 1 to 10% |
| SrO | 5 to 10% |
| $TiO_2$ | 0.1 to 5% and |
| $ZrO_2$ | 1 to 5%, | and above all, the above composition more preferably has an $Al_2O_3$ content of 1 to 5 mol %.

The merit of the above composition 1 is that the matrix glass having the above composition 1 having a larger $SiO_2$ content and a smaller $TiO_2$ content in the above ranges can give a glass having a Young's modulus of at least 95 GPa and a bending strength of at least 400 MPa and having excellent devitrification resistance, and that the X-ray absorption coefficient can be increased by increasing the SrO content.

Further, the matrix glass for a cathode ray tube, provided by the present invention, preferably has a composition 2 comprising, by mol %,

| | |
|---|---|
| $SiO_2$ | 40 to 50% |
| $Al_2O_3$ | 1 to 10% |
| $Li_2O$ | 7 to 15% |
| $Na_2O$ | 0.1 to 8% |
| $CeO_2$ | 0.01 to 1% |
| MgO | 1 to 10% |
| CaO | 1 to 10% |
| MgO + CaO | 10 to 20%, |
| SrO | 5 to 15% |
| $TiO_2$ | 5 to 15% and |
| $ZrO_2$ | 1 to 5%, | and above all, the above composition more preferably has an $Al_2O_3$ content of 1 to 5 mol %.

The merit of the above composition 2 is that the matrix glass having the above composition 2 having a larger $TiO_2$ content in the above range can give a glass having a Young's modulus of at least 100 GPa and a bending strength of at least 400 MPa, and that the X-ray absorption coefficient can be increased by increasing the SrO content.

The characteristic feature of the above composition 1 is that the matrix glass has excellent devitrification resistance and easiness in processability over the composition 2, and the characteristic feature of the composition 2 is that a glass having the composition 2 has a higher Young's modulus than a glass from the composition 1.

After a glass having the above preferred composition 1 or the above more preferred composition 2 is chemically strengthened, the surface of the glass has a Knoop hardness of at least 600 GPa (particularly, 650 GPa or more). Since the glass has a high Knoop hardness, the chemical strengthening can prevent not only the growth of crack in the surface but also the development of crack deep in the glass.

The method for the matrix glass of the present invention is not specially limited, and the matrix glass can be produced by a conventional method. For example, the matrix glass can be produced by a method in which oxides, hydroxides, carbonates, nitrates, chlorides, sulfides, etc., are properly provided as raw glass materials, these materials are weighed to obtain a composition as desired, the weighed materials are mixed to prepare a formulated material, the formulated material is placed in a heat-resistant crucible and melted at a temperature of approximately 1,300 to 1,500° C., the melt is stirred and clarified to obtain a homogeneous molten glass, the glass is cast into a molding frame to form a glass block, to form a glass sheet or to press the glass in the form of a cathode ray tube (CRT), the thus-formed glass is re-placed in a furnace under heat around an annealing point and cooled to room temperature, and the gradually cooled glass block is sliced and polished, the glass shaped in the form of a sheet is cut, polished and thermally bent or the press-formed glass is polished as required.

The matrix glass is chemically strengthened by the step of ion-exchange of the polished glass in a molten alkali salt. This step involves the same procedures as those employed in an ion-exchange step for a conventional chemically strengthened glass. The composition of the molten salt is selected depending upon a composition of the glass. The polished glass is immersed in the molten salt for a predetermined period of time, then taken out and washed.

Ion-exchange among alkali metal ions is preferred since the ion-exchange can be uniformly carried out by immersing the glass in the molten salt so that it is excellent in productivity and that a glass having a stabilized compressive-stress layer can be provided at a low cost. Further, the compressive-stress layer is formed by the ion-exchange, the compressive-stress layer can be efficiently formed even in a glass having a small thickness. Further, since the formation of the compressive-stress layer by the ion-exchange does not depend upon any form of the glass, a panel for a cathode ray tube which panel has a complicated form can be easily strengthened. The above chemical strengthening is therefore preferred. Further, when the glass is heat-treated, the compression stress does not easily decrease unlike a physically strengthened glass, and the strength of the glass does not easily decrease, so that the above chemical strengthening is preferred.

Further, the matrix glass for a cathode ray tube, containing both $Li_2O$ and $Na_2O$ which are well balanced, is subjected to ion-exchange in a molten salt containing both sodium ion and potassium ion, whereby lithium ion in the glass and sodium ion in the molten salt are exchanged and sodium ion in the glass and potassium ion in the molten salt are exchanged, so that sufficient strength can be attained.

In the present invention, in the ion-exchanged glass, lithium ion and sodium ion contained in the matrix glass are replaced with sodium ion and potassium ion, respectively, so that sodium ion and potassium ion are co-present in the glass surface and that lithium ion is also co-present in some cases. The present invention therefore produces a high effect on prevention of the coloring that takes place when the glass is irradiated with electron beams.

The stress-strain layer can be measured for a thickness by a Babinet compensation method using a precision strain gauge or a method using a polarizing microscope. The Babinet compensation method using a precision strain gauge can be carried out with a commercially available measuring device. In the method using a polarizing microscope, a glass sample is sliced perpendicularly to the ion-exchange surface, the cross-sectional surface of the thus-prepared slice is polished to have a thickness of 0.5 mm or less, and while polarized light is allowed to enter the sample at right angles with the polished surface, the surface is observed in the state of crossed Nicols through a polarizing microscope. Since a chemically strengthened glass has a stress-strain layer formed in the vicinity of its surface, a distance from the surface to a portion showing a change in brightness or color is measured, whereby the stress-strain layer can be measured for a thickness.

Further, a chemically strengthened glass and a physically strengthened glass can be distinguished on the basis of distributions of metal ions contained near glass panel surfaces. Specifically, distributions of depths of a metal ion having a larger ionic radius (e.g., alkali metal ion) and a metal ion having a smaller ionic radius (e.g., alkali metal ion) are studied. If (density of metal ion having a larger ionic radius)/(density of metal ion having a smaller ionic radius) in a portion near the surface of a glass is larger than the counterpart in a deep portion of the glass, and if the glass has a bending strength in the range specified in the present invention, the glass is found to be one that is chemically strengthened by ion-exchange.

When metal ion (typically, alkali metal ion) in the surface layer of a glass is further ion-exchanged with metal ion having a larger ionic radius (typically, alkali metal ion), the larger ion infiltrates while press-reducing a glass network, so that a compression stress layer is formed in the vicinity of the surface. A range in which the above stress works refers to a compression stress layer. Since the compression stress layer is a stress layer in any case, the compression stress is alleviated if the glass is heat-treated at a temperature equal to, or higher than, a strain point (the alleviation also depends upon a time period).

As described above, the compression stress layer is a stress layer in any case, so that the compression stress is alleviated if the glass is heat-treated at a temperature equal to, or higher than, a strain point(the alleviation also depends upon a time period). However, the stress-strain layer formed by chemical strengthening is not so easily alleviated as any counterpart formed by physical strengthening, and when the glass is used as a panel for a cathode ray tube, which panel is to be exposed to heat treatment, the glass rarely suffers a decrease in strength.

A glass 1b for a cathode ray tube, provided by the present invention, can be obtained by the above chemical strengthening of the above matrix glass for a cathode ray tube. The glass 1b for a cathode ray tube can satisfy at least one of the foregoing conditions (1) to (5).

According to the present invention, further, a glass for a cathode ray tube which glass has high strength can be produced by chemically strengthening the above matrix glass for a cathode ray tube by ion-exchange thereof in a bath containing Na ion or K ion or both at a temperature of 350° C. to 550° C. Therefore, a thin glass for a cathode ray tube can be obtained without decreasing its strength.

The glass panel for a cathode ray tube, provided by the present invention, is formed the above glass 1a for a cathode ray tube or the above glass Ib for a cathode ray tube, and this glass panel has the following effects.

First, since the glass itself has a high Young's modulus, there can be obtained a glass panel that is almost free from distortion. Further, since the glass panel does not distort even when a pressure is exerted on the panel surface due to a difference in pressures inside and outside the cathode ray tube, distortions of images can be decreased.

Second, since the glass itself has a high Young's modulus and high bending strength, the glass panel for a cathode ray tube can be decreased in thickness while maintaining pressure resistance (durability against a load).

Third, since the glass not only has high strength but also has a compression stress layer having a substantial thickness of 50 μm or more, abrasion bending strength can be improved. Therefore, a thin and light-weight glass panel for a cathode ray tube can be obtained without decreasing the strength thereof.

Fourth, when a glass panel for a cathode ray tube and a funnel are bonded to each other with a frit seal under heat to produce a cathode ray tube, the panel can be decreased in thickness and the panel rarely breaks against a rapid change in temperatures. Therefore, the heating rate and the cooling rate before and after the step of frit seal can be increased, so that the productivity of cathode ray tubes can be improved.

Fifth, since the glass panel chemically strengthened by ion-exchange has a surface having a high hardness, the surface is not easily damaged. For this reason and due to the above compression stress layer having a large thickness, the glass panel for a cathode ray tube is not easily damaged.

The above glass panel for a cathode ray tube, provided by the present invention, has a compression stress layer having a thickness of 50 μm or more, so that the strength of the glass panel does not easily decrease even if the glass is damaged. For example, the glass shows a bending strength, i.e., abrasion bending strength, of at least 200 MPa after it is abraded with a #150 sand paper. Therefore, the glass panel provided by the present invention has high resistance against damage that may be caused on the glass during the production and use of a cathode ray tube, and it is suitable as a glass panel for a cathode ray tube.

In the above glass panel for a cathode ray tube, preferably, a portion having the smallest thickness has a thickness $\frac{1}{200}$ to $\frac{1}{50}$ as large as the diagonal line thereof. In this case, the distortion caused on the glass panel due to a pressure difference can be decreased.

When the thickness of the portion having the smallest thickness is less than $\frac{1}{200}$ of the diagonal line, the distortion of the panel caused by a pressure difference may not be decreased.

The glass panel for a cathode ray tube, provided by the present invention, is suitable as a glass panel for a flat-surface cathode ray tube.

The glass panel of the present invention exhibits the above effects when applied to a flat-surface panel whose resistance to pressures to be exerted on the panel constituting a cathode ray tube is lower than that of a conventional cathode ray tube having a curved surface.

The above glass panel for a cathode ray tube can be produced by the steps of processing the above matrix glass for a cathode ray tube to prepare a panel, and chemically strengthening the panel by ion-exchange in a bath containing Na ion or K ion or both which bath is heated to 350° C. to 550° C.

The cathode ray tube of the present invention has the thus-produced glass panel for a cathode ray tube. This cathode ray tube can be produced by integrating the glass panel for a cathode ray tube and a funnel with a frit seal under heat.

The invention 2 will be explained hereinafter.

In the invention 2, a matrix glass having relatively larger contents of $Al_2O_3$ and SrO is chemically strengthened for producing a glass II for a cathode ray tube which glass has a stress-strain layer having a large thickness and has high strength and a high X-ray absorption coefficient. It has been thought that a conventional glass for CRT suffers a decrease in X-ray absorption coefficient and shows degraded meltability when it contains more than 4% by weight of $Al_2O_3$. The present invention can overcome this problem by incorporating a proper amount of SrO.

When the content of $Al_2O_3$ is increased, the chemical-strengthening efficiency increases, which is advantageous for forming a stress-strain layer having a large thickness. SrO is a component for serving to increase the $Al_2O_3$ content without decreasing the meltability of a glass, and it is also a component for improving the glass in X-ray absorptivity. The present invention can therefore simultaneously satisfy requirements of a glass for a cathode ray tube that the glass is to have excellent X-ray absorptivity and is to be suitable for chemical strengthening.

The matrix glass used in the present invention contains, as essential components, $SiO_2$, $Al_2O_3$, alkali metal oxides, SrO and $ZrO_2$ and further contains, as essential component(s), $TiO_2$ or $CeO_2$ or both. Further, the matrix glass preferably contains BaO and $Sb_2O_3$ as optional components.

When one of the above $TiO_2$ and $CeO_2$ is incorporated, the coloring that glass has due to irradiation with X-ray can be decreased. In the present invention, it is preferred to use both $TiO_2$ and $CeO_2$ for preventing the coloring.

The composition of the matrix glass will be explained below.

$SiO_2$ is an essential component for a glass. When the content thereof is less than 40% by weight, the glass may be poor in chemical durability and devitrification resistance, and when it exceeds 70% by weight, it is sometimes difficult to melt the matrix glass. The content of $SiO_2$ is preferably 40 to 70% by weight, more preferably 55 to 65% by weight.

$Al_2O_3$ is the most important component for improving a glass in devitrification resistance and chemical durability and improving the efficiency of ion exchange. When the content thereof is less than 4% by weight, the ion-exchange rate is low, and it takes a time to obtain a stress-strain layer having a large thickness. When it exceeds 20% by weight, a glass is poor in devitrification resistance. The content of $Al_2O_3$ is therefore limited to more than 4% by weight but not more than 20% by weight. For forming a stress-strain layer having a large thickness, for example, a thickness (depth) of 100 μm, the content of $Al_2O_3$ is preferably 5 to 20% by weight, more preferably 6 to 20% by weight, still more preferably 10 to 15% by weight.

The alkali metal oxides contained in the matrix glass are preferably $Na_2O$ and $K_2O$, or they are preferably $Li_2O$, $Na_2O$ and $K_2O$.

While $Li_2O$ is not an essential component, it is a component not only for improving a glass in meltability but also for chemically strengthening the glass by undergoing ion-exchange in a glass surface portion mainly with Na ion in an ion-exchange bath, so that $Li_2O$ can improve the ion-exchange efficiency. However, when the content thereof exceeds 3% by weight, the devitrification resistance and the chemical durability decrease. Further, the viscosity of the glass decreases, so that it is difficult to mold the glass. The content of $Li_2O$ is therefore preferably limited to 0 to 3% by weight, and the content thereof is more preferably 0 to 1% by weight.

$Na_2O$ is a component not only for improving a glass in meltability but also for chemically strengthening the glass to prevent browning by undergoing ion-exchange in a glass surface portion mainly with K ion in an ion-exchange bath. When the content thereof is less than 4% by weight, the effect thereof is poor. When it exceeds 20% by weight, it causes the devitrification resistance and chemical durability of the glass to decrease. The content of $Na_2O$ is therefore preferably limited to 4 to 20% by weight, and it is more preferably 5 to 10% by weight.

$K_2O$ is a component for improving a glass in meltability and for preventing the coloring that the glass suffers due to irradiation with X-ray. When the content thereof is less than 1% by weight, the above effects are not exhibited, and when it exceeds 10% by weight, the ion-exchange rate decreases. The content of $K_2O$ is therefore preferably limited to 1 to 10% by weight, and it is more preferably 5 to 10% by weight.

SrO is a component that can remarkably increase the X-ray absorption coefficient, and it is an important component for improving a glass in meltability. Further, it is a component that serves to incorporate a relatively large amount of $Al_2O_3$ which works to promote the ion-exchange. When the content thereof is less than 5% by weight, the X-ray absorption coefficient is less than 28/cm. When it exceeds 20% by weight, the liquidus temperature increases. The content of SrO is therefore limited to 5 to 20% by weight, and it is preferably 8 to 15% by weight.

While BaO is not an essential component, it is a component for improving the X-ray absorption coefficient and improving a glass in meltability. The effect of BaO on improving the X-ray absorption coefficient is lower than SrO. However, it can be preferably used since it is less expensive. When the content of BaO exceeds 15% by weight, the ion-exchange efficiency decreases. Therefore, the content of BaO is preferably limited to 0 to 15% by weight, and it is more preferably 5 to 12% by weight.

$ZrO_2$ is an important component for improving the X-ray absorption coefficient and improving a glass in chemical durability, devitrification resistance and ion-exchange efficiency. When the content of $ZrO_2$ is less than 1% by weight, the effects thereof are not exhibited. When it exceeds 7% by weight, the glass is not easily melted. The content of $ZrO_2$ is therefore preferably limited to 1 to 7% by weight, and it is more preferably 2 to 5% by weight.

$TiO_2$ is a component for preventing the coloring that a glass suffers due to irradiation with X-ray. When the content thereof is less than 0.1% by weight, the effect thereof is not exhibited. When it exceeds 1% by weight, the glass is colored to a great extent. The content of $TiO_2$ is therefore preferably 0.1 to 1% by weight.

$CeO_2$ is a component for preventing the coloring that a glass suffers due to irradiation with X-ray. When the content thereof is less than 0.1% by weight, the effect thereof is not exhibited. When it exceeds 1% by weight, the glass is liable to be colored in yellow. The content of $TiO_2$ is therefore preferably 0.1 to 1% by weight.

While $Sb_2O_3$ is not an essential component, it is used as a clarifying agent. The content of $Sb_2O_3$ is 0 to 1% by weight.

In the matrix glass used in the present invention, the total content of the above essential components and the above optional components is preferably at least 90% by weight. In addition to the above components, the above glass matrix may contain at least one selected from MgO, CaO, ZnO, $La_2O_3$, $P_2O_5$, $B_2O_3$, $SnO_2$, NiO, $Co_2O_3$, $Cr_2O_3$ or F for improvement of meltability, clarification, adjustment of a thermal expansion coefficient and an X-ray absorption coefficient, adjustment of an ion-exchange rate, prevention of solarization and adjustment of a transmissivity. Of these components, MgO, CaO and ZnO are components for improving the meltability of a glass, and the content thereof is preferably 0 to 4% by weight.

Desirably, the matrix glass substantially does not contain any lead that colors the glass due to irradiation with X-ray. The wording "substantially does not contain" means that the matrix glass contains no lead except impurities.

The above matrix glass contains a relatively large amount of $Al_2O_3$ as compared with a conventional glass for a cathode ray tube, so that the glass transition temperature of the matrix glass is as high as 550° C. or higher. The strain point of the matrix glass is therefore high, and even when the glass is heated during the step of frit sealing in the assembly of a cathode ray tube, the stress-strain layer is not easily alleviated, so that a decrease in strength can be prevented even after the cathode ray tube is assembled.

Further, since the matrix glass has a high glass transition temperature of 550° C. or higher, a glass in the form of a plate can be easily shaped, and the glass is advantageous for producing a glass panel by cutting the glass in the form of a plate.

The method for producing the matrix glass used in the present invention is not specially limited, and the matrix glass can be produced by a conventional method. For example, the matrix glass can be produced by a method in which oxides, hydroxides, carbonates, nitrates, chlorides, sulfides, etc., are properly provided as raw glass materials, these materials are weighed to obtain a composition as desired, the weighed materials are mixed to prepare a formulated material, the formulated material is placed in a heat-resistant crucible and melted at a temperature of approximately 1,400 to 1,500° C., the melt is stirred and clarified to obtain a homogeneous molten glass, the glass is cast into a molding frame to form a glass block, the thus-formed glass block is re-placed in a furnace under heat around an annealing point and cooled to room temperature, and the gradually cooled glass block is cut and polished.

The glass II for a cathode ray tube, provided by the present invention, is a product formed by chemical strengthening of the above matrix glass, and the method for production thereof is not critical. However, the glass for a cathode ray tube can be efficiently produced according to the following method of the present invention.

In the method of the present invention, the matrix glass having the above composition is chemically strengthened. The chemical strengthening is carried out by a conventional method, that is, a method in which ion-exchange is carried out in a bath containing alkali metal ion which bath is heated at 350 to 550° C.

Specifically, the matrix glass is immersed in a molten salt maintained at a temperature lower than the strain point of the glass, taken out after a predetermined period of time and then washed. The composition of the molten salt is selected depending upon the composition of the glass. It is efficient to use a salt containing K ion when the glass contains Na, and it is efficient to use a salt containing Na ion when the glass contains Li. The molten salt may be a molten salt of a simple substance, or it may be molten mixed salts. As a salt, a nitrate is preferred. Since a nitrate has a low decomposition temperature, a carbonate, a sulfate, etc., are additionally used as required. The temperature for the chemical strengthening is properly 350 to 550° C. when a nitrate is used.

While the time period for the immersion differs depending upon a treatment temperature, it is preferably within 24 hours, more preferably within 8 hours, particularly preferably within 4 hours in view of productivity.

The matrix glass is chemically strengthened as described above, whereby the formation of a stress-strain layer having a thickness of 100 μm or more and a bending strength of at least 300 MPa can be achieved. And, there can be obtained the glass for a cathode ray tube, provided by the present invention, which glass has a stress-strain layer having a large thickness and has high strength and a high X-ray absorption coefficient.

The stress-strain layer can be measured for a thickness in the same manner as in the already described invention 1.

In the glass II for a cathode ray tube, provided by the present invention, preferably, the glass II has an internal tensile stress of less than 20 MPa and a surface compression stress of at least 100 MPa for the same reason as that explained with regard to the glass Ia for a cathode ray tube in the invention 1.

According to the invention 2, there is also provided a glass panel for a cathode ray tube, particularly for a flat-surface cathode ray tube, which panel is formed of the above glass II of the present invention, and a cathode ray tube having the above glass panel for a cathode ray tube.

The invention 3 will be explained below.

The strengthened glass according to the invention 3 relies on a glass composition to a very small degree, and it satisfies a stress-strain layer having a large thickness and a high bending strength.

A desirable condition is that a matrix glass for use in the present invention contains at least one of $Li_2O$ and $Na_2O$. For obtaining a high-strength stress-strain layer (compression stress layer) by ion-exchange, it is required to replace a movable ion in the glass with an ion having a larger ionic radius. In view of efficiency and a cost, it is effective to replace Li with Na and to replace Na with K. In addition to an easiness in ion-exchange, i.e., chemical strengthening, the merit of a glass containing a proper amount of $Li_2O$ or $Na_2O$ or both is that it can be efficiently chemically strengthened since it has a thermal expansion coefficient which is high to some extent and has a low annealing point and a low strain point. For this reason, the content of $Li_2O$ or $Na_2O$ or both is preferably 5 to 20% by weight as a total.

The strengthened glass IIIa of the present invention is a product obtained by physically strengthening the matrix glass and further chemically strengthening the physically strengthened glass. For the physical strengthening, a conventional method can be employed. That is, a glass heated to an annealing point or higher but lower than a softening point is brought into contact with a low-temperature gas, liquid or solid, to provide a temperature difference between the surface and the inside of the glass. When the glass is cooled such that the glass temperature comes near to a strain point, the temperature difference remains as a strain in the glass. This strain is a stress-strain. The stress-strain formed in the above process of cooling a glass constitutes a stress-strain layer (compression stress layer) and works to improve the glass in bending strength. However, since an extreme temperature difference causes the glass to be deformed or destroyed, the above process is practically used at a cooling rate at which the glass is neither deformed nor destroyed. The thickness of the stress-strain layer formed by the above physical strengthening is approximately ⅙ of the glass thickness, and the glass comes to have a bending strength of up to 200 MPa in practical use.

The chemical strengthening can be also carried out by a conventional method. However, it is essential to treat the matrix glass at a temperature lower than the strain point of the glass. It is because of this point that the chemical strengthening is carried out after the physical strengthening. When the treatment is carried out at a temperature higher than the strain point, the strain layer formed by the physical strengthening is alleviated to disappear. Specifically, the glass is immersed in a molten salt maintained at a temperature lower than the strain point of the glass and maintained in the molten salt for a predetermined time period, and then, the glass is taken out and washed. The composition of the molten salt is selected depending upon the composition of the glass, It is effective and advantageous to use a salt containing Na ion when the glass contains Li, and it is effective and advantageous to use a salt containing K ion when the glass contains Na.

The above molten salt may be a molten salt of a simple substance, or it may be molten mixed salts. As a salt, a nitrate having a low melting point is preferred. Since a nitrate also has a low decomposition temperature, a carbonate, a sulfate, etc., are additionally used as required. The temperature for the treatment is properly 350 to 550° C. when a nitrate is used. The time period for the immersion differs depending upon a treatment temperature, it is-preferably within 24 hours, more preferably within 8 hours, particularly preferably within 4 hours in view of productivity.

The step of the physical strengthening and the step of the chemical strengthening may be individual independent steps, or they may be continuous steps. For example, the glass is heated to a temperature of an annealing point or higher but lower than a softening point, and then immerdiately immersed in a molten salt maintained at a temperature lower than a strain point. In this case, a temperature difference takes place between the surface and the inside of the glass, so that a stress-strain layer is formed. When the glass is immersed on for a predetermined time period, ion-exchange takes place between the surface of the glass and the molten salt, and a comprssion stress layer based on the chemical strengthening is added.

It can be found out by studying distributions of metal ions contained near the glass surface whether the glass is chemically strengthened. A distribution of depth of metal ion having a larger ionic radius (e.g., alkali metal ion) and a distribution of depth of metal ion having a smaler ionic radius (e.g., alkali metal ion) are studied. If (density of metal ion having a larger ionic radius)/(density of metal ion having a smaller ionic radius) in a portion near the surface of a glass is larger than the counterpart in a deep portion of the glass, and if the glass has a bending strength in the range specified in the present invention, the glass is found to be one that is chemically strengthened by ion-exchange.

When the glass is used as a glass panel for a cathode ray tube, the present invention imposes a relatively moderate limitation on the composition of the glass as is described already. In view of suitability to the chemical strengthening carried out after the physical strengthening, it is preferred to use the following matrix 1 and the following matrix glass 2.

First, the matrix glass 1 will be explained below.

The matrix glass 1 is a glass which comprises $SiO_2$, $Al_2O_3$, $Li_2O$, $Na_2O$, $SrO$, $TiO_2$, $ZrO_2$ and $CeO_2$ and also contains MgO or CaO or both, and which has an $Li_2O$ content of 5 to 20 mol %, an SrO content of 3 to 15 mol % and a $ZrO_2$ content of 0.1 to 5 mol %.

In the above glass, more preferably, the contents of $SiO_2$, $Al_2O_3$, $Li_2O$, $Na_2O$, $TiO_2$, MgO and CaO are as follows. By mol %, the content of $SiO_2$ is 40 to 70%, the content of $Al_2O_3$ is 0.1 to 15%, the content of $Na_2O$ is 0.1 to 10%, the content of MgO is 0 to 15%, the content of CaO is 0 to 15%, the content of $TiO_2$ is 0.1 to 15%, and the total content of $SiO_2$, $Al_2O_3$, $Li_2O$, $Na_2O$, SrO, $TiO_2$, $ZrO_2$, MgO, CaO and $CeO_2$ is at least 85%.

In addition to the above glass components, the above matrix glass 1 may contain one or a plurality of components selected from BaO, ZnO, $La_2O_3$, $Cs_2O$, $P_2O_5$, $B_2O_3$, $SnO_2$, $Y_2O_3$, $Nb_2O_5$, $Sb_2O_3$, $SnO_2$, $K_2O$ or F in a total amount of 15 mol % or less.

Further, in addition to the above glass components, the matrix glass 1 may further contain one or a plurality of components selected from oxides of Ni, Co, Fe, Mn, V, Cu and Cr in a total amount of 1 mol % or less.

In the matrix glass 1, $SiO_2$ is a basic component for a glass. When the content thereof is less than 40 mol %, the glass may be poor in devitrification resistance and chemical durability, and when it exceeds 70 mol %, it is sometimes difficult to melt the matrix glass. The content of $SiO_2$ is therefore limited to 40 to 70 mol %, and it is preferably 45 to 60 mol %, more preferably 50 to 55 mol %.

$Al_2O_3$ is a component for improving a glass in devitrification resistance and chemical durability and improving the efficiency of ion exchange. When the content thereof is less than 0.1 mol %, the effects thereof are not exhibited. When it exceeds 15 mol %, the glass is poor in devitrification resistance. The content of $Al_2O_3$ is therefore limited to 0.1 to 15 mol %. Further, $Al_2O_3$ is also a component for increasing the X-ray absorption coefficient, and the content thereof is preferably 1 to 10 mol %, and still more preferably 1 to 5 mol %.

$Li_2O$ is a component for chemically strengthening a glass by undergoing ion-exchange in a glass surface portion mainly with Na ion in an ion-exchange bath. When the content thereof is less than 5 mol %, the effect thereof is not exhibited. When it exceeds 20 mol %, the glass is poor in devitrification resistance and the chemical durability. The content of $Li_2O$ is therefore limited to 5 to 20 mol %. Since $Li_2O$ is also a component for decreasing the X-ray absorption coefficient, the content thereof is preferably 7 to 18 mol %, more preferably 10 to 15 mol %.

$Na_2O$ is a component for chemically strengthening a glass by undergoing ion-exchange in a glass surface portion mainly with K ion in an ion-exchange bath and for preventing browning. When the content thereof is less than 0.1 mol %, the effects thereof are not exhibited. When it exceeds 10 mol %, it causes the devitrification resistance and chemical durability of the glass to decrease. The content of $Na_2O$ is therefore limited to 0.1 to 10 mol %. Since $Na_2O$ is also a component for decreasing the X-ray absorption coefficient as well, the content thereof is preferably 1 to 5 mol %.

MgO is a component for improving a glass in Young's modulus, and the matrix glass may contain 0 to 15 mol % of MgO. When the content thereof exceeds 15 mol %, the X-ray absorption coefficient is decreased. The content of MgO is therefore limited to 0 to 15 mol %, and it is preferably 5 to 10 mol %.

CaO is a component for improving a glass in X-ray absorption coefficient and Young's modulus, and the matrix glass may contain 0 to 15 mol %. When the content thereof exceeds 15 mol %, the liquidus temperature is caused to increase. The content of CaO is therefore limited to 0 to 15 mol %, and it is preferably 5 to 10 mol %.

SrO is a component that plays an important role in the glass of the present invention. SrO is a component that can remarkably increase the X-ray absorption coefficient, and it has been found that SrO does not much decrease the Young's modulus and the bending strength when added. When the content thereof is less than 3 mol %, the X-ray absorption coefficient is less than 28. When it exceeds 15 mol %, the devitrification resistance decreases. The content of SrO is therefore limited to 3 to 15 mol %. The content of SrO is preferably 5 to 13 mol %.

BaO is an optional component, and since it is a component for improving the X-ray absorption coefficient, it may be incorporated. However, the function of BaO to increase the X-ray absorption coefficient is approximately half the function of SrO, and BaO is also a component that decreases the Young's modulus, so that the content of BaO is preferably 0 to 5 mol %.

ZnO is an optional component and has a high effect on increasing the X-ray absorption coefficient. Since, however, it decreases the bending strength and the Young's modulus, the content thereof is preferably less than 5 mol %.

TiO$_2$ is a component for improving a glass in Young's modulus and X-ray absorption coefficient and for preventing the coloring caused by X-ray. When the content thereof is less than 0.1 mol %, the effect thereof is not exhibited. When it exceeds 15 mol %, the devitrification resistance is low. The content of TiO$_2$ is therefore limited to 0.1 to 15 mol %. Further, TiO$_2$ absorbs light having a shorter wavelength of light that a glass transmits, and it is liable to cause the glass to be colored, so that the content thereof is therefore preferably 0.1 to 5 mol %.

ZrO$_2$ is also one of components that play important roles in the glass of the present invention. ZrO$_2$ is a component for improving a glass in Young's modulus, X-ray absorption coefficient and bending strength. When the content thereof is less than 0.1 mol %, the effect thereof is not exhibited. When it exceeds 5 mol %, a remaining undissolved portion of a glass is liable to take place. The content of ZrO$_2$ is therefore limited to 0.1 to 5 mol %. The content of ZrO$_2$ is preferably 1 to 3 mol %.

CeO$_2$ is a component for preventing the coloring (browning) caused by X-ray. The content thereof is preferably 0.01 to 1 mol %.

K$_2$O is an optional component and may be incorporated into the matrix glass for preventing the coloring (browning) caused by X-ray. The content thereof is preferably 0 to 5 mol %.

In addition to the above glass components, the above glass matrix may contain one or more optional components selected from La$_2$O$_3$, Cs$_2$O, P$_2$O$_5$, B$_2$O$_3$, Y$_2$O$_3$, Nb$_2$O$_5$, Sb$_2$O$_3$, SnO$_2$ or F for making it easier to produce a glass or adjusting the properties of the glass, namely for an improvement in meltability, clarification, an improvement in devitrification resistance, adjustment of the viscosity of a glass, adjustment of a thermal expansion coefficient and an X-ray absorption coefficient, adjustment of the Young's modulus, adjustment of an ion-exchange rate, prevention of solarization and prevention of browning.

Further, the above matrix glass may contain one or a plurality of components selected from oxides of Ni, Co, Fe, Mn, V, Cu and Cr, as required for adjusting the transmissivity of the glass.

The matrix glass 1 substantially does not contain PbO. That is because it is environmentally undesirable to use PbO and because PbO is a component that degrades the chemical strengthening and decreases the Young's modulus.

The matrix glass 1 preferably has a composition 1 comprising, by mol %,

| | |
|---|---|
| SiO$_2$ | 50 to 60% |
| Al$_2$O$_3$ | 1 to 10% |
| Li$_2$O | 10 to 20% |
| Na$_2$O | 0.1 to 8% |
| CeO$_2$ | 0.01 to 1% |
| MgO | 1 to 10% |
| CaO | 1 to 10% |
| SrO | 5 to 10% |
| TiO$_2$ | 0.1 to 5% and |
| ZrO$_2$ | 1 to 5%, | and above all, the above composition more preferably has an Al$_2$O$_3$ content of 1 to 5 mol %.

The merit of the above composition 1 is that the matrix glass having the above composition 1 having a larger SiO$_2$ content and a smaller TiO$_2$ content in the above ranges can give a glass having a Young's modulus of at least 95 GPa and a bending strength of at least 400 MPa and having excellent devitrification resistance, and that the X-ray absorption coefficient can be increased by increasing the SrO content.

Further, the matrix glass 1 preferably has a composition 2 comprising, by mol %,

| | |
|---|---|
| SiO$_2$ | 40 to 50% |
| Al$_2$O$_3$ | 1 to 10% |
| Li$_2$O | 7 to 15% |
| Na$_2$O | 0.1 to 8% |
| CeO$_2$ | 0.01 to 1% |
| MgO | 1 to 10% |
| CaO | 1 to 10% |
| MgO + CaO | 10 to 20%, |
| SrO | 5 to 15% |
| TiO$_2$ | 5 to 15% and |
| ZrO$_2$ | 1 to 5%, | and above all, the above composition more preferably has an Al$_2$O$_3$ content of 1 to 5 mol %.

The merit of the above composition 2 is that the matrix glass having the above composition 2 having a larger TiO$_2$ content in the above range can give a glass having a Young's modulus of at least 100 GPa and a bending strength of at least 400 MPa, and that the X-ray absorption coefficient can be increased by increasing the SrO content.

The characteristic feature of the above composition 1 is that the matrix glass has excellent devitrification resistance and easiness in processability over the composition 2, and the characteristic feature of the composition 2 is that a glass having the composition 2 has a higher Young's modulus than a glass from the composition 1.

After the glass matrix 1 having the above preferred composition 1 or the above more preferred composition 2 gives a chemically strengthened glass whose surface has a Knoop hardness of at least 600 GPa (particularly, 650 GPa or more). Since the glass has a high Knoop hardness, the chemical strengthening can prevent not only the growth of crack in the surface but also the development of crack deep in the glass.

The method for the above matrix glass 1 is not specially limited, and the matrix glass 1 can be produced by a conventional method. For example, the matrix glass 1 can be produced by a method in which oxides, hydroxides, carbonates, nitrates, chlorides, sulfides, etc., are properly provided as raw glass materials, these materials are weighed to obtain a composition as desired, the weighed materials are mixed to prepare a formulated material, the formulated material is placed in a heat-resistant crucible and melted at a temperature of approximately 1,300 to 1,500° C., the melt is stirred and clarified to obtain a homogeneous molten glass, the glass is cast into a molding frame to form a glass block, to form a glass sheet or to press the glass in the form of a cathode ray tube (CRT), the thus-formed glass is re-placed in a furnace under heat around an annealing point and cooled to room temperature, and the gradually cooled glass block is sliced and polished, the glass shaped in the form of a sheet is cut, polished and thermally bent or the press-formed glass is polished as required.

The matrix glass 2 will be explained below.

The matrix glass 2 contains, as essential components, SiO$_2$, Al$_2$O$_3$, alkali metal oxides, SrO and ZrO$_2$ and further contains, as essential component(s), TiO$_2$ or CeO$_2$ or both. Further, the matrix glass 2 contains BaO and Sb$_2$O$_3$ as optional components. The content of SrO is 5 to 20% by weight, and the total content of the above essential components and the optional components is at least 90% by weight.

For obtaining a stress-strain layer having a large thickness by chemical strengthening, the content of the above $Al_2O_3$ is preferably 0.1 to 20% by weight, more preferably more than 4.0% by weight but not more than 20% by weight, still more preferably 5 to 20% by weight.

The matrix glass 2 further preferably has a composition containing, by % by weight, 0 to 3% of $Li_2O$, 4 to 20% of $Na_2O$ and 1 to 10% of $K_2O$ as alkali metal oxides and containing, by % by weight, 40 to 70% of $SiO_2$, 1 to 7% of $ZrO_2$, 0.1 to 1% of $TiO_2$, 0.1 to 1% of $CeO_2$, 0 to 15% of BaO and 0 to 1% of $Sb_2O_3$ as the above $SiO_2$, $ZrO_2$, $TiO_2$, $CeO_2$, BaO and $Sb_2O_3$.

Desirably, the above matrix glass 2 substantially does not contain any lead for preventing the coloring caused by irradiation with X-ray. The wording "substantially does not contain" means that the matrix glass 2 contains no lead except impurities. Lead is environmentally undesirable and is also a component that degrades the chemical strengthening and decreases the Young's modulus.

The glass matrix 2 may contain at least one selected from MgO, CaO, ZnO, $La_2O_3$, $P_2O_5$, $B_2O_3$, $SnO_2$, NiO, $Co_2O_3$, $Cr_2O_3$ or F in an amount of 10% by weight or less.

In the above matrix glass 2, $SiO_2$ is a basic component for a glass. When the content thereof is less than 40 mol %, the glass may be poor in chemical durability and devitrification resistance, and when it exceeds 70% by weight, it is difficult to melt the matrix glass. The content of $SiO_2$ is therefore limited to 40 to 70% by weight, and it is preferably 45 to 65% by weight.

$Al_2O_3$ is a component for improving a glass in devitrification resistance, chemical durability and ion-exchange rate. When the content thereof is less than 0.1% by weight, the glass is liable to devitrify, and it takes a time to form a stress-strain layer having a large thickness. When it exceeds 20% by weight, the glass is poor in devitrification resistance. The content of $Al_2O_3$ is therefore desirably more than 0.1% by weight but not more than 20% by weight. For forming a stress-strain layer having a thickness (depth) of 100 μm or more, the content of $Al_2O_3$ is preferably 4 to 20% by weight, more preferably more than 5.0% by weight but not more than 20% by weight, still more preferably 10 to 15 mol %.

The alkali metal oxides contained in the matrix glass are preferably $Na_2O$ and $K_2O$, or they are preferably $Li_2O$, $Na_2O$ and $K_2O$.

While $Li_2O$ is not an essential component, it is a component for improving a glass in meltability and also for chemically strengthening the glass by undergoing ion-exchange in a glass surface portion mainly with Na ion in an ion-exchange bath, so that $Li_2O$ can improve the ion-exchange efficiency. Further, the co-presence thereof with $Na_2O$ produces an effect on the prevention of browning. However, when the content thereof exceeds 3% by weight, the devitrification resistance and the chemical durability decrease. Further, the viscosity of the glass decreases, so that it is difficult to mold the glass. The content of $Li_2O$ is therefore preferably is 0 to 3% by weight, more preferably 0 to 1% by weight.

$Na_2O$ is a component not only for improving a glass in meltability but also for chemically strengthening the glass by undergoing ion-exchange in a glass surface portion mainly with K ion in an ion-exchange bath. When the content thereof is less than 4% by weight, the effect thereof is poor. When it exceeds 20% by weight, it causes the devitrification resistance and chemical durability of the glass to decrease. The content of $Na_2O$ is therefore preferably 4 to 20% by weight, more preferably 5 to 10% by weight.

$K_2O$ is a component for improving a glass in meltability and for preventing the coloring that the glass suffers due to irradiation with X-ray. When the content thereof is less than 1% by weight, the above effects are not exhibited, and when it exceeds 10% by weight, the ion-exchange rate decreases. The content of $K_2O$ is therefore preferably limited to 1 to 10% by weight, and it is more preferably 5 to 10% by weight.

SrO is a component that can remarkably increase the X-ray absorption coefficient, and it is an important component for improving a glass in meltability. Further, it is a component that serves to incorporate a relatively large amount of $Al_2O_3$ which works to promote the ion-exchange. When the content of SrO is less than 5% by weight, the X-ray absorption coefficient is less than 28/cm. When it exceeds 20% by weight, the liquidus temperature increases. The content of SrO is therefore preferably limited to 5 to 20% by weight, and it is more preferably 8 to 15% by weight.

While BaO is not an essential component, it is a component for improving the X-ray absorption coefficient and improving a glass in meltability. The effect of BaO on improving the X-ray absorption coefficient is lower than SrO. However, it can be preferably used since it is less expensive. When the content of BaO exceeds 15% by weight, the ion-exchange efficiency decreases. Therefore, the content of BaO is preferably limited to 0 to 15% by weight, and it is more preferably 5 to 12% by weight.

$ZrO_2$ is an important component for improving the X-ray absorption coefficient and improving a glass in chemical durability, devitrification resistance and ion-exchange efficiency. When the content of $ZrO_2$ is less than 1% by weight, the effects thereof are not exhibited. When it exceeds 7% by weight, the glass is not easily melted. The content of $ZrO_2$ is therefore preferably limited to 1 to 7% by weight, and it is more preferably 2 to 5% by weight.

$TiO_2$ is a component for preventing the coloring that a glass suffers due to irradiation with X-ray. When the content thereof is less than 0.1% by weight, the effect thereof is not exhibited. When it exceeds 1% by weight, the glass is colored to a great extent. The content of $TiO_2$ is therefore preferably 0.1 to 1% by weight.

$CeO_2$ is a component for preventing the coloring that a glass suffers due to irradiation with X-ray. When the content thereof is less than 0.1% by weight, the effect thereof is not exhibited. When it exceeds 1% by weight, the glass is liable to be colored in yellow. The content of $TiO_2$ is therefore preferably 0.1 to 1% by weight.

While MgO, CaO and ZnO are not essential components, they may be incorporated since they are components for improving a glass in meltability. The content thereof is preferably 0 to 4% by weight.

While $Sb_2O_3$ is not an essential component, either, it is preferably used as a clarifying agent. The content of $Sb_2O_3$ is preferably 0 to 1% by weight.

In addition to the above components, the glass matrix 2 may contain $La_2O_3$, $P_2O_5$, $B_2O_3$, $SnO_2$, NiO, $Co_2O_3$, $Cr_2O_3$ and F for improvement of meltability, clarification, adjustment of the thermal expansion coefficient and an X-ray absorption coefficient, adjustment of an ion-exchange rate, prevention of solarization and adjustment of a transmissivity.

The method for producing the matrix glass 2 is not specially limited, and the matrix glass 2 can be produced by a conventional method. For example, the matrix glass 2 can be produced by a method in which oxides, hydroxides, carbonates, nitrates, chlorides, sulfides, etc., are properly provided as raw glass materials, these materials are weighed to obtain a composition as desired, the weighed materials are mixed to prepare a formulated material, the formulated material is placed in a heat-resistant crucible and melted at a temperature of approximately 1,400 to 1,500° C., the melt is stirred and clarified to obtain a homogeneous molten glass, the glass is cast into a molding frame to form a glass block, the thus-formed glass block is re-placed in a furnace under heat around an annealing point and cooled to room temperature, and the gradually cooled glass block is cut and polished.

Both the above matrix glasses 1 and 2 are suitable for chemical strengthening and excellent in X-ray absorption characteristics. Besides the above matrix glasses, general glasses such as soda lime glass can be also used as a matrix glass.

The strengthened glass IIIa of the present invention can be produced by physically strengthening the above matrix glass containing alkali metal(s) and further chemically strengthening the physically strengthened glass at a temperature lower than the strain point of the matrix glass. The strengthened glass of the present invention is obtained by the physical strengthening of the matrix glass having the specific composition and the chemical strengthening thereof as described above, whereby it has a stress-strain layer having a thickness of at least 250 μm, preferably at least 300 μm, still more preferably at least 400 μm and having a bending strength of at least 300 MPa, preferably at least 350 MPa, still more preferably at least 400 MPa and an X-ray absorption coefficient of at least 28/cm.

The stress-strain layer can be measured for a thickness as explained with regard to the foregoing invention 1.

Further, for the same reasons as that explained with regard to the glass Ia for a cathode ray tube, preferably, the strengthened glass IIIa has an internal tensile stress of less than 20 MPa and a surface compression stress of at least 100 MPa.

A chemically strengthened glass and a physically strengthened glass can be distinguished on the basis of distributions of metal ions contained near the surface of a glass panel as is explained with regard to the foregoing invention 1. Specifically, distributions of depths of a metal ion having a larger ionic radius (e.g., alkali metal ion) and a metal ion having a smaller ionic radius (e.g., alkali metal ion) are studied. A ratio of (density of metal ion having a larger ionic radius)/(density of metal ion having a smaller ionic radius) in a portion near the surface of a glass is larger than the counterpart in a deep portion of the glass. In the strengthened glass of the present invention, therefore, the stress-strain layer formed by the chemical strengthening is found in a portion nearer to the glass surface, and in a relatively deep portion, a stress-strain layer is formed, but the above metal ion distribution characteristic of the chemical strengthening is not found.

According to the present invention, further, there is provided a strengthened glass having a stress-strain layer having a thickness of at least 250 μm and having a bending strength of at least 300 MPa and preferably an X-ray absorption coefficient of at least 28/cm.

Further, for the same reasons as that explained with regard to the glass Ia for a cathode ray tube, preferably, the strengthened glass IIIb has an internal tensile stress of less than 20 MPa and a surface compression stress of at least 100 MPa.

When the strengthened glasses IIIa and IIIb of the present invention have a bending strength of at least 300 MPa, the stress-strain layer of each has a thickness of at least 250 μm, preferably at least 300 μm, particularly preferably at least 400 μm. Further, when the bending strength is at least 350 MPa, the stress-strain layer of each also has a thickness of at least 250 μm, preferably at least 300 μm, particularly preferably at least 400 μm. Furthermore, when the bending strength is at least 400 MPa, the stress-strain layer of each also has a thickness of at least 250 μm, preferably at least 300 μm, particularly preferably at least 400 μm.

The present invention further provides a glass for a display which glass is formed of the above strengthened glass IIIa or IIIb of the present invention, a glass panel for a cathode ray tube which glass panel is formed of the above glass for a display, a cathode ray tube having the above glass panel, and a method for a cathode ray tube which comprises producing a strengthened glass from a matrix glass having an X-ray absorption coefficient of at least 28/cm, preparing a glass panel from the strengthened glass, and integrating the glass panel and a funnel with a frit seal under heat.

In any one of the above inventions 1 to 3, the method for forming a glass material into a glass panel includes a method in which a glass plate heated is shaped into a glass panel by bending it, a press-molding method and a method using a float process. When the glass panel is produced by press molding, a skirt portion is molded together. For physically strengthening a panel-shaped molded article having such a skirt portion, it is required to rapidly cool a molded product having a high temperature after its press-molding or to provide a cooling rate with an intentional distribution. There are therefore involved problems that the shrinking rate of the glass varies so that a molded product is deformed and that yield of glass panels decreases. According to the present invention, however, there is no limitation to be imposed on the cooling unlike the physical strengthening, or the limitation on the above cooling can be alleviated by employing the chemical strengthening in combination with the physical strengthening.

Preferably, the chemical strengthening step is carried out after hot processing or cold processing such as shaping of a molten glass into a shaped glass, cutting of the glass in a desired form or polishing of the glass surface.

In the inventions 1 to 3, the chemical strengthening is carried out by immersing a glass in a molten salt to effect ion-exchange. In this case, a voltage may be applied between the molten salt and the glass. The above application of a voltage can improve the rate and efficiency of the ion-exchange.

The chemical strengthening step may be followed by the step of removing alkali ion and hydronium ion on the glass surface. Alkali ion or hydronium ion is sometimes precipitated on the glass surface after the chemical strengthening. Such a precipitated ion deteriorates a fluorescence material attached to a glass panel and sometimes causes a problem that display colors differ. The above problem can be overcome in advance by adding the above step.

The glass panel chemically strengthened in the present invention has the following features.

(1) The stress-strain layer is formed by ion-exchange in the glass panel surface, so that a strain layer can be formed uniformly in the entire surface. Therefore, distortion and undulation are very small.

(2) The central portion of the glass (portion of the chemically strengthened glass which portion has a maximum tensile stress) has a tensile stress of less than 20 MPa, so that the self-fracture problem can be decreased.

(3) The stress-strain layer has a thickness of at least 50 μm, and there is no case where the strength greatly decreases due to damage in the production process or practical use.

(4) The compression stress formed in the surface is at least 100 MPa, and the glass panel has a high bending strength, so that the glass can be decreased in thickness while retaining strength against pressure. As a result, the glass panel has a decreased weight, and a cathode ray tube having a decreased weight can be produced.

The present invention optimizes the chemical strengthening method (e.g., physical strengthening is followed by chemical strengthening) or chemical compositions for attaining the above features.

According to the invention 1, there can be obtained a glass for a cathode ray tube or a glass panel for a cathode ray tube which glass or glass panel has composition and properties required for making it possible to decrease the glass or glass panel in thickness and weight. Therefore, the glass for a cathode ray tube or the glass panel for a cathode ray tube can be decreased in thickness and weight.

According to the invention 1, further, there can be produced a cathode ray tube having sufficient strength and having attained a decrease in weight.

According to the invention 1, particularly, there can be obtained a glass panel for a flat-surface cathode ray tube which glass panel is decreased in thickness and weight.

According to the invention 2, a matrix glass that can form a stress-strain layer deep in the glass by ion exchange is chemically strengthened to for a glass for a cathode ray tube, so that there can be provided a glass for a cathode ray tube which glass has high strength and a high X-ray absorption coefficient.

Further, since the above glass is used for a glass panel for a cathode ray tube, there can be provided a glass panel for a cathode ray tube which glass panel has high strength and a high X-ray absorption coefficient.

Further, the above glass panel is used for a cathode ray tube, there can be provided a cathode ray tube having a relatively light weight without decreasing the strength and X-ray absorption characteristics.

According to the production method in the invention 2, a glass for a cathode ray tube which glass has high strength and a high X-ray absorption coefficient can be efficiently produced.

Further, according to the invention 3, a strengthened glass provided with a thick stress-strain layer and a high bending strength can be easily produced even from a glass composition which has made it difficult to satisfy both a thick stress-strain layer and a high bending strength.

The strengthened glass according to the invention 3 is suitable particularly for a glass panel for a display.

The glass for a cathode ray tube or the strengthened glass according to the inventions 1 to 3 can be suitably used not only for producing CRTs but also for producing a glass panel for a display which is exposed to a difference in pressures inside and outside the display, such as a glass panel for a field emission display (FED) or a glass panel for a plasma display (PDP).

EXAMPLES

The present invention will be explained with reference to Examples hereinafter, while the present invention shall not be limited by these Examples.

Examples 1–8, Referential Example 1 and Comparative Example 1

Raw materials such as oxides, hydroxides, carbonates, nitrates, chlorides, sulfates, etc., were weighed to prepare a composition shown in Table 1 or 2, and mixed to obtain a formulated material. The formulated material was placed in a platinum crucible, heated to 1,400° C. and melted, and the melt was stirred, homogenized and clarified. Then, the molten glass was cast into a casting mold. After the glass solidified, the glass was re-placed in an electric furnace heated to a temperature around the annealing point of the glass in advance, and the glass was gradually cooled to room temperature.

A 65×10×1 mm both-surface-polished sample was prepared from the thus-obtained glass block and subjected to ion-exchange. A molten salt had a composition of $NaNO_3$:$KNO_3$ (=2:3 (weight ratio)). The above glass sample was immersed in the molten salt having a maintained temperature of 380 to 460° C. for a predetermined time period, then taken out and washed.

Tables 1 and 2 show glass compositions and various measurement data.

X-ray absorption coefficient refers to data obtained by allowing X-ray having a wavelength of 0.06 nm to enter a glass sample, measuring a transmitted-light quantity at a position 50 mm far from an opposite surface of the glass sample and calculating an absorption coefficient.

Thickness of a stress-strain layer refers to data obtained by polishing a cross section of a sample and measuring the stress-strain layer through a precision strain gauge.

Non-abrasion bending strength refers to data obtained by measuring an ion-exchanged sample according to the three-point bending test of JIS-R1601.

150 Abrasion bending strength refers to data obtained by uniformly abrading the surface of an ion-exchanged sample with a #150 sand paper and carrying out a three-point bending test while applying a load such that a tensile stress was exerted on the surface being abraded.

TABLE 1

|  | Ex. 1 | Ex. 2 | Ex. 3 | Ex. 4 | Ex. 5 |
|---|---|---|---|---|---|
| Glass Composition (mol %) | | | | | |
| $SiO_2$ | 45.0 | 51.0 | 54.0 | 45.8 | 42.8 |
| $Al_2O_3$ | 2.0 | 1.8 | 2.6 | 2.0 | 3.0 |
| $Li_2O$ | 11.0 | 13.0 | 17.0 | 9.0 | 10.0 |
| $Na_2O$ | 2.0 | 6.0 | 1.0 | 4.0 | 3.0 |
| $K_2O$ | 1.3 | 0.0 | 0.5 | 0.0 | 2.0 |
| MgO | 0.0 | 6.0 | 4.0 | 13.0 | 9.0 |
| CaO | 12.5 | 6.0 | 8.0 | 0.0 | 10.0 |
| SrO | 12.5 | 6.0 | 5.6 | 11.0 | 5.0 |
| $TiO_2$ | 12.5 | 6.0 | 3.0 | 12.0 | 13.0 |
| $ZrO_2$ | 1.0 | 3.0 | 3.0 | 2.0 | 2.0 |
| $CeO_2$ | 0.1 | 0.1 | 0.1 | 0.1 | 0.1 |
| $Sb_2O_3$ | 0.1 | 0.1 | 0.2 | 0.1 | 0.1 |
| $Y_2O_3$ | 0.0 | 1.0 | 0.0 | 0.0 | 0.0 |
| $La_2O_3$ | 0.0 | 0.0 | 1.0 | 0.0 | 0.0 |
| BaO | 0.0 | 0.0 | 0.0 | 1.0 | 0.0 |
| Total | 100.0 | 100.0 | 100.0 | 100.0 | 100.0 |
| MgO + CaO | 12.5 | 12.0 | 12.0 | 13.0 | 19.0 |
| X-ray absorption coefficient ($cm^{-1}$) | 37 | 28 | 28 | 35 | 30 |
| Specific gravity | 3.1 | 2.8 | 2.8 | 3.0 | 2.9 |
| Young's modulus (GPa) | 110 | 103 | 102 | 110 | 114 |
| Specific elastic modulus (GPa) | 35 | 36 | 36 | 36 | 39 |
| Strain point (° C.) | 570 | 520 | 530 | 560 | 550 |
| Temperature (° C.) for ion-exchange | 450 | 420 | 400 | 420 | 440 |
| Time period (hour) for ion-exchange | 16 | 4 | 4 | 4 | 8 |
| Thickness (μm) of stress-strain layer | 70 | 80 | 80 | 80 | 90 |

TABLE 1-continued

|  | Ex. 1 | Ex. 2 | Ex. 3 | Ex. 4 | Ex. 5 |
|---|---|---|---|---|---|
| Non-abrasion bending strength (MPa) | 500 | 500 | 650 | 450 | 500 |
| #150 Abrasion bonding strength (MPa) | 320 | 350 | 400 | 280 | 300 |
| Compresive stress (Mpa) | 510 | 400 | 500 | 450 | 450 |
| Tensile stress (MPa) | 10 | 10 | 10 | 10 | 10 |

Ex. = Example

TABLE 2

|  | Ex. 6 | Ex. 7 | Ex. 8 | REx. 1 | CEx. 1 |
|---|---|---|---|---|---|
| Glass Composition (mol %) |  |  |  |  |  |
| $SiO_2$ | 46.0 | 50.0 | 62.0 | 68.0 | 70.6 |
| $Al_2O_3$ | 2.0 | 8.0 | 2.0 | 9.2 | 0.9 |
| $Li_2O$ | 9.0 | 10.8 | 13.0 | 10.5 | 0.0 |
| $Na_2O$ | 2.0 | 1.7 | 1.0 | 9.1 | 12.5 |
| $K_2O$ | 0.0 | 0.0 | 0.0 | 0.0 | 0.6 |
| MgO | 11.8 | 0.0 | 4.0 | 0.0 | 5.9 |
| CaO | 13.0 | 12.0 | 6.8 | 0.0 | 9.5 |
| SrO | 6.0 | 13.0 | 5.0 | 0.0 | 0.0 |
| $TiO_2$ | 8.0 | 1.0 | 2.0 | 0.0 | 0.0 |
| $ZrO_2$ | 2.0 | 2.0 | 4.0 | 3.1 | 0.0 |
| $CeO_2$ | 0.1 | 0.3 | 0.1 | 0.0 | 0.0 |
| $Sb_2O_3$ | 0.1 | 0.2 | 0.1 | 0.1 | 0.0 |
| $Y_2O_3$ | 0.0 | 1.0 | 0.0 | 0.0 | 0.0 |
| $La_2O_3$ | 0.0 | 0.0 | 0.05 | 0.0 | 0.0 |
| BaO | 0.0 | 0.0 | 0.01 | 0.0 | 0.0 |
| Total | 100.0 | 100.0 | 100.0 | 100.0 | 100.0 |
| MgO + CaO | 24.8 | 12.0 | 10.8 | 0.0 | 15.4 |
| X-ray absorption coefficient ($cm^{-1}$) | 28 | 28 | 30 | 13 | 3 |
| Specific gtavity | 2.9 | 2.9 | 2.8 | 2.5 | 2.5 |
| Young's modulus (GPa) | 113 | 95 | 92 | 75 | 73 |
| Specific elastic modulus (GPa) | 39 | 31 | 32 | 30 | 29 |
| Strain point (° C.) | 550 | 560 | 530 | 500 | 500 |
| Temperature (° C.) for ion-exchange | 450 | 400 | 400 | 380 | 460 |
| Time period (hour) for ion-exchange | 4 | 16 | 16 | 4 | 1 |
| Thickness ($\mu m$) of stress-strain layer | 80 | 100 | 100 | 150 | 30 |
| Non-abrasion bending strength (MPa) | 500 | 550 | 600 | 500 | 290 |
| #150 Abrasion bonding strength (MPa) | 340 | 350 | 400 | 300 | 50 |
| Compresive stress (Mpa) | 300 | 200 | 200 | 150 | 300 |
| Tensile stress (MPa) | 10 | 10 | 10 | 10 | 10 |

Ex. = Example,
REx. = Referential Example,
CEx. = Comparative Example

The glasses obtained in Examples 1 to 8 had an X-ray absorption coefficient of 28 or more, a Young's modulus of more than 90 GPa, a specific elastic modulus of more than 30 GPa, a non-abrasion bending strength of more than 400 MPa and a stress-strain layer (compression stress layer) thickness of more than 50 $\mu$m. Further, these glasses had a abrasion bending strength of more than 250 MPa.

The glasses obtained in Referential Example 1 and Comparative Example 1 had a Young's modulus of less than 80 GPa and an X-ray absorption coefficient of less than 20, so that these glasses are not suitable as a glass for a cathode ray tube or a glass for a flat-surface display.

Further, those glasses disclosed in Publications discussed in Related Art Statement have compositions outside the scope of the present invention and fail to satisfy the properties of the glass of the present invention.

Example 9 and Comparative Example 2

A conventional non-strengthened glass for a cathode ray tube which glass had a composition shown in Table 3 was processed into sizes of 65×10×5 mm and 65×10×10 mm (Comparative Example 2). Further, a glass having the same composition as that in Example 1 was processed to the same sizes and subjected to ion-exchange under conditions shown in Example 1 of Table 1 (Example 9).

These glass samples were measured for a breaking load by a three-point bending test at a span of 50 mm. Table 4 shows the results.

As shown in Table 4, the load durability that can be conventionally attained by the glass having a thickness of 10 mm as shown in Comparative Example 2 can be attained by the glass in Example 9 which glass has a thickness ½ as large as the thickness of the glass in Comparative Example 2. In practical products, therefore, the glass thickness required due to the conventional limitation of pressure durability can be decreased, so that the products can be decreased in weight.

TABLE 3

|  | CEx. 2 |
|---|---|
| Glass Composition (mol %) |  |
| $SiO_2$ | 76.0 |
| $Al_2O_3$ | 1.0 |
| $Li_2O$ | 0.0 |
| $Na_2O$ | 9.3 |
| $K_2O$ | 3.5 |
| MgO | 1.6 |
| CaO | 2.3 |
| SrO | 3.6 |
| $TiO_2$ | 0.4 |
| $ZrO_2$ | 0.5 |
| $CeO_2$ | 0.1 |
| $Sb_2O_3$ | 0.0 |
| BaO | 1.7 |
| Content | 100.0 |
| X-ray absorption coefficient ($c^{-1}$) | 29 |
| Specific gravity | 2.7 |
| Young's modulus (GPa) | 76 |
| Specific elastic modulus (GPa) | 28 |
| Strain point (° C) | 477 |
| Non-abrasion bending strength (MPa) | 98 |

CEx. = Comparative Example

TABLE 4

| Plate Thickness | Breaking load | |
|---|---|---|
|  | Ex. 9 | CEx. 2 |
| 5 mm | 1,570 N | 294 N |
| 10 mm | 6,370 N | 1,180 N |

Ex = Example, CEx. = Comparative Example

Example 10

A plate-shaped glass having the composition shown in Example 1 (thickness 10 mm, thickness of a smallest-thickness portion 8 mm) was subjected to ion-exchange under conditions shown in Example 1 of Table 1, to obtain a glass panel for a 36-inch flat-surface Braun tube. The panel had a weight of approximately 20 kg and had a decreased weight as compared with a conventional panel having a weight of 40 kg. Further, the panel had a decreased thickness as compared with a conventional panel having a thickness of 20 mm or more. Further, it was found that the panel having a large size had sufficient strength.

Examples 11–16 and Comparative Example 3

Raw materials such as oxides, hydroxides, carbonates, nitrates, chlorides, sulfates, etc., were weighed to prepare a composition shown in Table 5, and mixed to obtain a formulated material. The formulated material was placed in a platinum crucible, heated to 1,400° C. and melted, and the melt was stirred, homogenized and clarified. Then, the molten glass was cast into a casting mold. After the glass solidified, the glass was re-placed in an electric furnace heated to a temperature around the annealing point of the glass in advance, and the glass was gradually cooled to room temperature.

The thus-obtained glass block was polished on both the surfaces to prepare a 65×10×1 mm plate-shaped glass sample. The glass sample was immersed in simple $KNO_3$ salt or an $NaNO_3/KNO_3$ mixed salts maintained at 380 to 450° C., for a predetermined time period, to carry out ion-exchange. Then, the sample was taken out and washed.

Table 5 shows glass compositions and various measurement data.

X-ray absorption coefficient refers to data obtained by allowing X-ray having a wavelength of 0.06 nm to enter a plate-shaped glass, measuring a transmitted-light quantity at a position 50 mm far from an opposite surface of the glass and calculating an absorption coefficient.

Thickness of a stress-strain layer refers to data obtained by polishing a cross section of an ion-exchanged sample and measuring the stress-strain layer through a precision strain gauge.

Non-abrasion bending strength refers to data obtained by measuring an ion-exchanged 65×10×1 mm sample according to the three-point bending test of JIS-R1601.

150 Abrasion bending strength refers to data obtained by uniformly abrading the surface of an ion-exchanged sample with a #150 sand paper and carrying out a three-point bending test while applying a load such that a tensile stress was exerted on the surface being abraded.

TABLE 5

|  | Ex. 11 | Ex. 12 | Ex. 13 | Ex. 14 | Ex. 15 | Ex. 16 | CEx. 3 |
|---|---|---|---|---|---|---|---|
| Glass Composition (wt %) | | | | | | | |
| $SiO_2$ | 47.5 | 50.5 | 55.5 | 53.0 | 57.0 | 62.0 | 60.6 |
| $Al_2O_3$ | 15.0 | 10.0 | 7.5 | 10.0 | 12.0 | 7.0 | 0.7 |
| $Li_2O$ | 0.0 | 0.0 | 0.0 | 2.0 | 0.0 | 1.0 | 0.0 |
| $Na_2O$ | 10.5 | 9.0 | 10.5 | 8.0 | 10.0 | 10.0 | 6.6 |
| $K_2O$ | 5.0 | 8.0 | 6.5 | 6.0 | 2.0 | 2.0 | 8.6 |
| MgO | 0.0 | 0.5 | 0.0 | 0.0 | 0.0 | 0.0 | 0.3 |
| CaO | 0.0 | 0.0 | 1.0 | 0.0 | 0.0 | 0.0 | 0.4 |
| SrO | 9.5 | 9.0 | 11.0 | 13.0 | 12.0 | 15.0 | 10.4 |
| BaO | 6.5 | 9.0 | 4.5 | 5.0 | 2.0 | 0.0 | 9.0 |
| $TiO_2$ | 0.5 | 0.5 | 0.5 | 0.4 | 0.4 | 0.4 | 0.5 |
| $ZrO_2$ | 4.5 | 3.0 | 3.0 | 1.0 | 4.0 | 2.0 | 2.1 |
| $CeO_2$ | 0.3 | 0.3 | 0.3 | 0.4 | 0.4 | 0.4 | 0.2 |
| $Sb_2O_3$ | 0.2 | 0.2 | 0.2 | 0.2 | 0.2 | 0.2 | 0.6 |
| ZnO | 0.0 | 0.0 | 0.0 | 1.0 | 0.0 | 0.0 | 0.0 |
| A 1) | 100.0 | 99.5 | 99.0 | 99.0 | 100.0 | 100.0 | 99.3 |
| Total | 100.0 | 100.0 | 100.0 | 100.0 | 100.0 | 100.0 | 100.0 |
| Transition temperature (° C.) | 620 | 600 | 570 | 580 | 600 | 580 | 520 |
| X-ray absorption coefficient ($cm^{-1}$) | 29 | 29 | 29 | 29 | 29 | 29 | 29 |
| Temperature for ion-exchange (° C.) | 460 | 440 | 430 | 460 | 450 | 460 | 400 |
| Time for ion-exchange (hour) | 4 | 4 | 4 | 4 | 4 | 4 | 4 |
| Stress-strain layer ($\mu$m) | 150 | 120 | 170 | 100 | 150 | 130 | 30 |
| Non-abrasion strength (Mpa) | 250 | 300 | 320 | 350 | 330 | 350 | 200 |
| #150 Abrasion strength (MPa) | 220 | 200 | 200 | 250 | 250 | 230 | 50 |

Ex. = Example, CEx. = Comparative Example
(Notes)
1) A: Total content of $SiO_2$, $Al_2O_3$, $Li_2O$, $Na_2O$, $K_2O$, SrO, BaO, $TiO_2$, $ZrO_2$, $CeO_2$ and $Sb_2O_3$.

As shown in Table 5, all of Examples 11 to 16 give chemically strengthened glasses having a stress-strain layer having a thickness (depth) of at least 100 $\mu$m and having a non-abrasion bending strength of at least 300 MPa, and all of these glasses have an X-ray absorption coefficient of more than 28/cm. The glasses obtained in Examples 11 to 16 can be fully used as a glass for a cathode ray tube, particularly as a glass panel therefor. Further, all of these glasses have a #150 abrasion bending strength of at least 200 MPa.

The above glasses obtained in Examples 11 to 16 were arranged to be glass panels for a flat-surface cathode ray tube, and the glass panels were integrated with funnels by frit sealing under heat to obtain 36-inch flat-surface cathode ray tubes. It was found that a difference in pressures inside and outside each cathode ray tube did not distort the thus-obtained cathode ray tubes, and that images were accordingly not distorted. It was also found that the glass panels did not undergo coloring (browning) due to irradiation with X-ray.

Example 17

A soda lime glass having a thickness of 5 mm was heated to approximately 700° C., cooled to 500° C. with air ejected through a nozzle having a cooling capability of 500 W/m$^2$·°C. and gradually cooled from 500° C. to room temperature. Then, the glass was immersed in a molten salt of potassium nitrate having a temperature of 450° C., maintained therein for 4 hours, then, taken out, cooled to room temperature and washed.

The obtained glass was measured for a stress-strain layer thickness and a bending strength. Table 6 shows the results. A glass sample having the same composition as above was strengthened by air only, and a glass sample having the same composition as above was chemically strengthened. These samples were similarly measured. Table 6 shows the results.

Each sample was measured for a stress-strain layer thickness through a precision strain gauge after the cross section of each was polished.

Bending strength refers to data obtained by measuring each sample having a size of 65×10×1 mm according to the three-point bending test of JIS-R1601.

TABLE 6

|  | Stress-strain layer | Bending strength |
| --- | --- | --- |
| The invention | 800 μm | 400 MPa |
| Air-strengthening alone | 800 μm | 150 MPa |
| Chemical strengthening alone | 30 μm | 300 MPa |

The above soda lime glass had a composition having the following contents shown by % by weight.

| | |
| --- | --- |
| $SiO_2$ | 71.2% |
| $Al_2O_3$ | 1.5% |
| $Na_2O$ | 13.1% |
| $K_2O$ | 0.9% |
| MgO | 4.1% |
| CaO | 8.9% |
| $SO_3$ | 0.3% |

Example 18

A 8 mm thick glass for a CRT was heated to approximately 700° C., and the glass was rapidly immersed in a molten salt of potassium nitrate having a temperature of 420° C., maintained therein for 4 hours, then, taken out, cooled to room temperature and washed.

The obtained glass was measured for a stress-strain layer thickness and a bending strength in the same manner as in Example 17. Table 7 shows the results. A glass sample having the same composition as above was treated by physical strengthening alone, a glass sample having the same composition as above was treated by chemical strengthening alone, and the treated samples were similarly measured. Table 7 shows the results.

TABLE 7

|  | Stress-strain layer | Bending strength |
| --- | --- | --- |
| The invention | 1 mm | 350 MPa |
| Physical strengthening alone | 1 mm | 150 MPa |
| Chemical strengthening alone | 50 μm | 250 MPa |

The above glass for a CRT had a composition having the following contents shown by % by weight.

| | |
| --- | --- |
| $SiO_2$ | 60.6% |
| $Al_2O_3$ | 1.0% |
| $Na_2O$ | 6.6% |
| $K_2O$ | 8.6% |
| MgO | 0.3% |
| CaO | 0.4% |
| SrO | 10.4% |
| BaO | 9.0% |
| $TiO_2$ | 0.5% |
| $ZrO_2$ | 2.1% |
| $CeO_2$ | 0.2% |
| $Sb_2O_3$ | 0.3% |

Example 19

A 8 mm thick glass for a CRT was heated to approximately 700° C., and the glass was rapidly immersed in molten mixed salts of sodium nitrate (40% by weight) and potassium nitrate (60% by weight) having a temperature of 400° C., maintained therein for 4 hours, then, taken out, cooled to room temperature and washed.

The obtained glass was measured for a stress-strain layer thickness and a bending strength in the same manner as in Example 17. Table 8 shows the results. A glass sample having the same composition as above was treated by physical strengthening alone, a glass sample having the same composition as above was treated by chemical strengthening alone, and the treated samples were similarly measured. Table 8 shows the results.

TABLE 8

|  | Stress-strain layer | Bending strength |
| --- | --- | --- |
| The invention | 1 mm | 650 MPa |
| Physical strengthening alone | 1 mm | 150 MPa |
| Chemical strengthening alone | 100 μm | 600 MPa |

The above glass for a CRT had a composition having the following contents shown by mol %.

| | |
| --- | --- |
| $SiO_2$ | 62.0% |
| $Al_2O_3$ | 2.0% |
| $Li_2O$ | 13.0% |
| $Na_2O$ | 1.0% |
| MgO | 4.0% |
| CaO | 6.8% |
| SrO | 5.0% |
| $TiO_2$ | 2.0% |
| $ZrO_2$ | 4.0% |
| $CeO_2$ | 0.1% |

-continued

|  |  |
|---|---|
| $Sb_2O_3$ | 0.1% |
| NiO | 0.05% |
| $Co_2C_3$ | 0.01% |

Example 20

A 8 mm thick glass for a CRT was heated to approximately 700° C., and the glass was rapidly immersed in a molten salt of potassium nitrate having a temperature of 400° C., maintained therein for 4 hours, then, taken out, cooled to room temperature and washed.

The obtained glass was measured for a stress-strain layer thickness and a bending strength in the same manner as in Example 17. Table 9 shows the results. A glass sample having the same composition as above was treated by physical strengthening alone, a glass sample having the same composition as above was treated by chemical strengthening alone, and the treated samples were similarly measured. Table 9 shows the results.

TABLE 9

|  | Stress-strain layer | Bending strength |
|---|---|---|
| The invention | 1 mm | 400 MPa |
| Physical strengthening alone | 1 mm | 150 MPa |
| Chemical strengthening alone | 100 µm | 350 MPa |

The above glass for a CRT had a composition having the following contents shown by % by weight.

|  |  |
|---|---|
| $SiO_2$ | 47.5% |
| $Al_2O_3$ | 15.5% |
| $Na_2O$ | 10.5% |
| $K_2O$ | 5.0% |
| SrO | 9.5% |
| BaO | 6.5% |
| $TiO_2$ | 0.5% |
| $ZrO_2$ | 4.5% |
| $CeO_2$ | 0.3% |
| $Sb_2O_3$ | 0.2% |

The strengthened glasses obtained in the above Examples were integrated with funnels with frit seals under heat to give cathode ray tubes. Desirably, the heating is carried out at a temperature lower than the strain point of each glass so that the stress-strain layers are not alleviated. In the above manner, there were obtained the cathode ray tubes having glass panels having a stress-strain layer having a thickness of at least 250 µm and having a bending strength of at least 350 MPa.

What is claimed is:

1. A cathode ray tube comprising a glass panel, which is made of a chemically strengthened glass from a matrix glass which comprises $SiO_2$, $Al_2O_3$, $Li_2O$, $Na_2O$, SrO, $TiO_2$, $ZrO_2$ and $CeO_2$ and also contains MgO or CaO or both and has a Young's modulus of at least 90 GPa.

2. The cathode ray tube of claim 1, wherein the glass panel has at least one of a specific elastic modulus (Young's modulus/specific gravity) of at least 30 GPa, a strain point of at least 500° C., an internal tensile stress of less than 20 MPa or a surface compression stress of at least 100 MPa.

3. A method for producing a cathode ray tube, which comprises the step of integrating the glass panel recited in claim 1 and a funnel by frit sealing under heat.

4. A cathode ray tube comprising a glass panel, which is made of a chemically strengthened glass from a matrix glass which comprises $SiO_2$, $Al_2O_3$, $Li_2O$, $Na_2O$, SrO, $TiO_2$, $ZrO_2$ and $CeO_2$ and also contains MgO or CaO or both and which has an $Li_2O$ content of 5 to 20 mol %, an SrO content of 3 to 15 mol % and a $ZrO_2$ content of 0.1 to 5 mol %.

5. The cathode ray tube of claim 4, wherein the glass panel has an $SiO_2$ content of 40 to 70 mol %, an $Al_2O_3$ content of 0.1 to 15 mol %, an $Na_2O$ content of 0.1 to 10 mol %, an MgO content of 0 to 15 mol %, a CaO content of 0 to 15 mol % and $TiO_2$ content of 0.1 to 15 mol % and has an $SiO_2+Al_2O_3+Li_2O+Na_2O+SrO+TiO_2+ZrO_2+CeO_2+MgO+CaO$ total content of at least 85 mol %.

6. The cathode ray tube of claim 5, wherein the glass panel has at least one of a Young's modulus of at least 90 GPa, a specific elastic modulus (Young's modulus/specific gravity) of at least 30 GPa, a strain point of at least 500° C., an internal tensile stress of less than 20 MPa or a surface compression stress of at least 100 MPa.

7. A method for producing a cathode ray tube, which comprises the step of integrating the glass panel recited in claim 4 and a funnel by frit sealing under heat.

\* \* \* \* \*